(12) United States Patent
Buma et al.

(10) Patent No.: US 7,905,499 B2
(45) Date of Patent: Mar. 15, 2011

(54) VEHICLE STABILIZER SYSTEM

(75) Inventors: Shuuichi Buma, Toyota (JP); Jaesung Cho, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 737 days.

(21) Appl. No.: 11/921,948

(22) PCT Filed: Jun. 13, 2006

(86) PCT No.: PCT/JP2006/312213
§ 371 (c)(1),
(2), (4) Date: Dec. 11, 2007

(87) PCT Pub. No.: WO2006/135088
PCT Pub. Date: Dec. 21, 2006

(65) Prior Publication Data
US 2009/0224493 A1    Sep. 10, 2009

(30) Foreign Application Priority Data

Jun. 16, 2005 (JP) .................................. 2005-175989

(51) Int. Cl.
*B60G 21/055* (2006.01)
(52) U.S. Cl. ....................................... 280/5.511; 701/38
(58) Field of Classification Search .............. 280/5.511; 180/443
See application file for complete search history.

(56) References Cited

U.S. PATENT DOCUMENTS 6,076,837 A * 6/2000 Kokotovic ................. 280/5.504
2003/0227271 A1 12/2003 Shindo

FOREIGN PATENT DOCUMENTS

| EP | 1 362 721 | 11/2003 |
|---|---|---|
| EP | 1 491 371 | 12/2004 |
| EP | 1 564 042 | 8/2005 |
| EP | 1 577 127 | 9/2005 |
| EP | 1 600 313 | 11/2005 |
| EP | 1 679 208 A1 | 7/2006 |

(Continued)

OTHER PUBLICATIONS

Ohta, Yuuki et al., "Development of an Electric Active Stabilizer System Based on Robust Design", SAE International 2006-01-0758, 2006.

(Continued)

*Primary Examiner* — Khoi Tran
*Assistant Examiner* — Rodney King
(74) *Attorney, Agent, or Firm* — Oblon, Spivak, McClelland, Maier & Neustadt, L.L.P.

(57) ABSTRACT

A stabilizer system for a vehicle includes a stabilizer bar and an actuator and that executes a control actively changing stiffness of the stabilizer bar in accordance with roll moment acting on a body of the vehicle. Each of a situation in which the vehicle is running straightforward and a situation in which a torque generating direction of a motor of the actuator changes in opposite direction plural times is identified as a specific situation. In the specific situation, a control of changing an operation mode of the motor such that presence or absence of occurrence of resistance of the actuator against its operation by external input force is changeable, and a control of limiting a supply current to the motor such that the torque generating direction of the motor is inhibited from coinciding with a direction away from a neutral position are executed.

15 Claims, 19 Drawing Sheets

FOREIGN PATENT DOCUMENTS

| | | |
|---|---|---|
| JP | 1-257614 | 10/1989 |
| JP | 2000 071738 | 3/2000 |
| JP | 2002 518245 | 6/2002 |
| JP | 2005-145360 | 6/2005 |
| JP | 2006-188080 | 7/2006 |

OTHER PUBLICATIONS

Suzuki, Satoshi et al., "Development of Electric Active Stabilizer Suspension System", SAE International 2006-01-1537, 2006.

* cited by examiner

FIG.5

| OPERATION MODE | TORQUE GENERATING DIRECTION | DETECTED SIGNALS OF HALL ELEMENTS | | | STATES OF SWITCHING ELEMENTS | | | | | |
|---|---|---|---|---|---|---|---|---|---|---|
| | | HA | HB | HC | WLC | VLC | ULC | WHC | VHC | UHC |
| POWER-SUPPLYING CONTROL MODE | CCW DIRECTION | H | L | H | 0 | 0 | 1 * | 0 | 1 | 0 |
| | | H | L | L | 0 | 0 | 1 * | 1 | 0 | 0 |
| | | H | H | L | 0 | 1 * | 0 | 1 | 0 | 0 |
| | | L | H | L | 0 | 1 * | 0 | 0 | 0 | 1 |
| | | L | H | H | 1 * | 0 | 0 | 0 | 0 | 1 |
| | | L | L | H | 1 * | 0 | 0 | 0 | 1 | 0 |
| | CW DIRECTION | H | L | H | 0 | 1 * | 0 | 0 | 0 | 1 |
| | | H | L | L | 1 * | 0 | 0 | 0 | 0 | 1 |
| | | H | H | L | 1 * | 0 | 0 | 0 | 1 | 0 |
| | | L | H | L | 0 | 0 | 1 * | 0 | 1 | 0 |
| | | L | H | H | 0 | 0 | 1 * | 1 | 0 | 0 |
| | | L | L | H | 0 | 1 * | 0 | 1 | 0 | 0 |
| STAND-BY MODE | CCW DIRECTION | H | L | H | 0 | 0 | 0 * | 0 | 1 | 0 |
| | | H | L | L | 0 | 0 | 0 * | 1 | 0 | 0 |
| | | H | H | L | 0 | 0 * | 0 | 1 | 0 | 0 |
| | | L | H | L | 0 | 0 * | 0 | 0 | 0 | 1 |
| | | L | H | H | 0 * | 0 | 0 | 0 | 0 | 1 |
| | | L | L | H | 0 * | 0 | 0 | 0 | 1 | 0 |
| | CW DIRECTION | H | L | H | 0 | 0 * | 0 | 0 | 0 | 1 |
| | | H | L | L | 0 * | 0 | 0 | 0 | 0 | 1 |
| | | H | H | L | 0 * | 0 | 0 | 0 | 1 | 0 |
| | | L | H | L | 0 | 0 | 0 * | 0 | 1 | 0 |
| | | L | H | H | 0 | 0 | 0 * | 1 | 0 | 0 |
| | | L | L | H | 0 | 0 * | 0 | 1 | 0 | 0 |
| BRAKING MODE | | | | | 0 | 0 | 0 | 1 | 1 | 1 |
| FREE MODE | | | | | 0 | 0 | 0 | 0 | 0 | 0 |

1 : ON STATE (CLOSED STATE)  
0 : OFF STATE (OPEN STATE)  
H : DETECTED STATE  
L : NON-DETECTED STATE  
1 * : UNDER DUTY CONTROL BY PWM  
0 * : STATE IN WHICH PULSE-ON TIME IS 0 UNDER DUTY CONTROL BY PWM

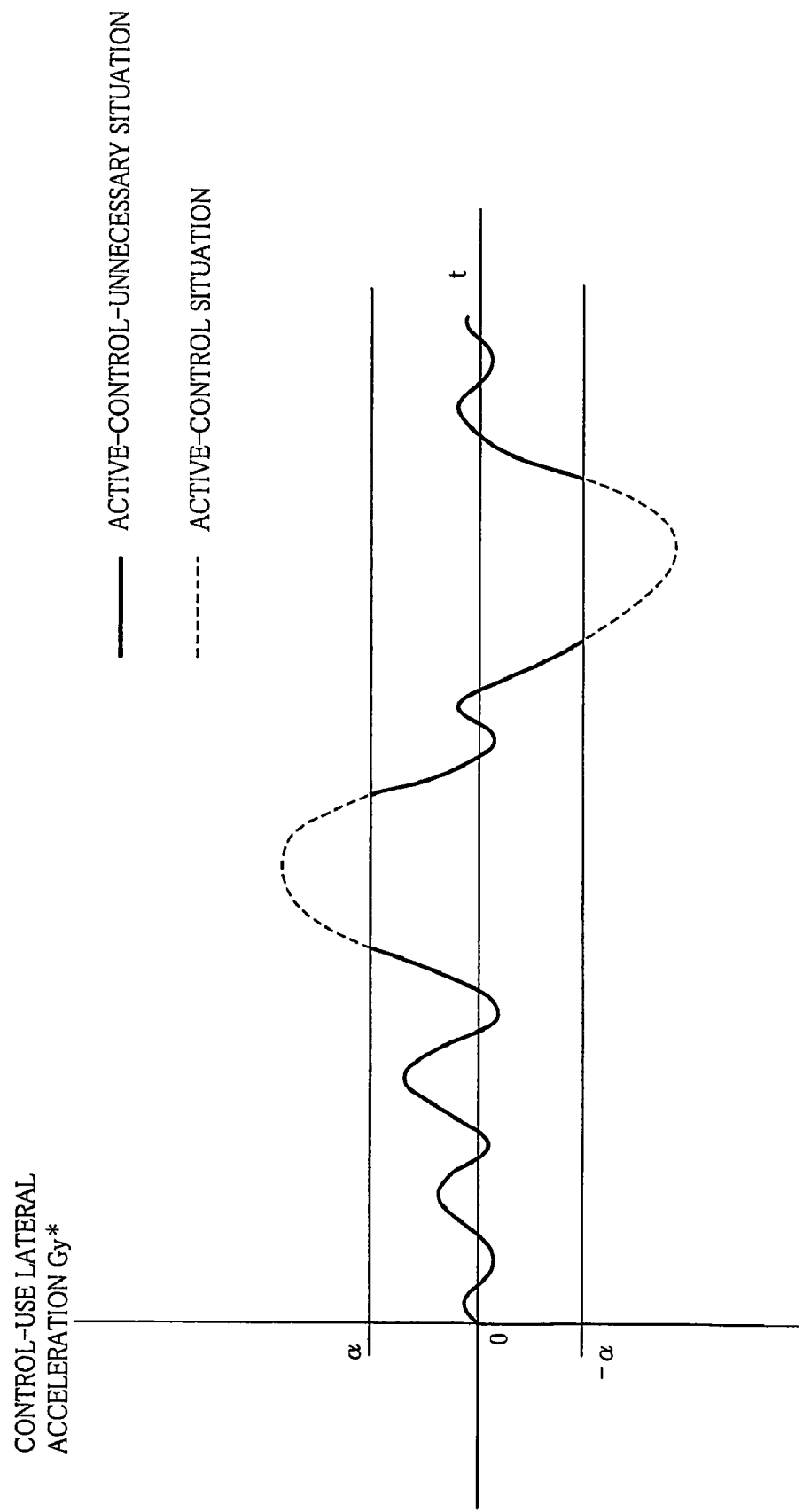

FIG.13

| | ROTATIONAL DIRECTION OF ELECTRIC MOTOR BY EXTERNAL INPUT FORCE | WHETHER OR NOT THE ACTUATOR EXHIBITS RESISTANCE AGAINST ROTATION THEREOF BY EXTERNAL INPUT FORCE |
|---|---|---|
| UNDER-ACTIVE-CONTROL-UNNECESSARY-SITUATION CONTROL | NEUTRAL DIRECTION | ACTUATOR EXHIBITS NO RESISTANCE |
| | COUNTER-NEUTRAL DIRECTION | ACTUATOR EXHIBITS NO RESISTANCE |
| DESIRED-CHARACTERISTIC-DEPENDENT CONTROL — RIDE-COMFORT-EMPHASIZING CHARACTERISTIC | NEUTRAL DIRECTION | ACTUATOR EXHIBITS RESISTANCE |
| | COUNTER-NEUTRAL DIRECTION | ACTUATOR EXHIBITS RESISTANCE |
| STABILITY-EMPHASIZING CHARACTERISTIC / NEUTRAL-POSITION-DEPENDENT CONTROL | NEUTRAL DIRECTION | ACTUATOR EXHIBITS NO RESISTANCE |
| | COUNTER-NEUTRAL DIRECTION | ACTUATOR EXHIBITS RESISTANCE |
| UNDER-BAD-ROAD-RUNNING CONTROL | NEUTRAL DIRECTION | ACTUATOR EXHIBITS NO RESISTANCE |
| | COUNTER-NEUTRAL DIRECTION | ACTUATOR EXHIBITS NO RESISTANCE |

VEHICLE STABILIZER SYSTEM

TECHNICAL FIELD

The present invention relates in general to a stabilizer system installed on a vehicle for reducing or restraining roll of a body of the vehicle, and more particularly to such a stabilizer system in which rigidity of a stabilizer bar is changeable by an actuator having an electric motor.

BACKGROUND ART

In recent years, there has been developed a so-called "active stabilizer system", in detail, a stabilizer system in which stiffness or rigidity of a stabilizer bar is changed for thereby effectively controlling or restraining roll of a vehicle body. For instance, JP-A-2002-518245 and JP-A-2000-71738 disclose such a stabilizer system. Each of the disclosed stabilizer systems is equipped with an actuator which has an electric motor and which changes the stiffness of the stabilizer bar. By controlling the operation of the actuator, the roll of the vehicle body is effectively restrained or suppressed.

DISCLOSURE OF THE INVENTION

(A) Summary of the Invention

The above-indicated active stabilizer system equipped with the actuator is arranged to generate, owing to power produced by the electric motor, roll-restraining or suppressing moment which counters roll moment that acts on the vehicle body upon turning of the vehicle, for instance. Described in detail, the active stabilizer system is structured to generate the roll-restraining moment with respect to the roll moment based on twisting of a stabilizer bar, by balancing force which is exerted by the actuator on the stabilizer bar owing to the power produced by the electric motor (hereinafter may be referred to as "actuator output force" or "actuator force"), with respect to force which compels the actuator to be operated due to external force such as the roll moment (hereinafter may be referred to as "external input force with respect to the actuator" or "external input force"). By changing the balance between the external input force and the actuator output force by the power produced by the electric motor, the operational position of the actuator is varied, and the roll amount of the vehicle body can be changed in response to the operational position. Namely, even where the same roll moment acts on the vehicle body, it is possible to establish different roll amounts by varying the operational position of the actuator, whereby the stiffness of the stabilizer bar with respect to the roll of the vehicle body is made changeable.

In the light of the structure of the stabilizer system mentioned above, delay in the operation of the actuator, external input force other than the above-indicated external input force arising from the roll moment due to the turning of the vehicle (e.g., disturbance external input force due to roughness or bumpiness of a road surface) are factors that deteriorate the vehicle stability, the vehicle ride comfort and the like. Accordingly, the active stabilizer system has enhanced utility by appropriately dealing with those factors. While the description made just above is one aspect relating to the stabilizer system, active stabilizers under development can be modified in various aspects and have much room for improvement to enhance the utility. The present invention has been made in the light of the above. It is therefore an object of the invention to improve the utility of the vehicle stabilizer system.

To achieve the above-indicated object, the present invention provides a vehicle stabilizer system equipped with an actuator which has an electric motor and which changes stiffness of a stabilizer bar, wherein the readiness with which the actuator is operated is made different in the direction of the operation of the actuator when the stabilizer system is placed in a certain specific situation.

The present stabilizer system is capable of appropriately coping with various conditions such as a condition in which the operation of the actuator is compelled and a condition in which the control of the actuator cannot be satisfactorily conducted, due to influences of the external input force and the like, in the certain specific situation such as a situation in which the roll moment is on the decrease and a situation in which the vehicle is traveling straightforward. Therefore, the present stabilizer system is effective to improve the vehicle stability and the vehicle ride comfort, assuring a high degree of utility.

(B) Forms of Invention

There will be described in detail various forms of an invention which is considered claimable (hereinafter may be referred to as "claimable invention"). Each of the forms of the invention is numbered like the appended claims and depends from the other form or forms, where appropriate, for easier understanding of the claimable invention. It is to be understood that the invention is not limited to the technical features or any combinations thereof which will be described, and shall be construed in the light of the following descriptions of the various forms and preferred embodiments of the invention. It is to be further understood that a plurality of elements or features included in any one of the following forms of the invention are not necessarily provided all together, and that any form in which one or more elements or one or more features is/are added to any one of the following forms and any form in which one or more elements or one or more features is/are deleted from any one of the following forms may be considered claimable.

(1) A stabilizer system for a vehicle comprising:

a stabilizer bar connected to left and right wheels at respective opposite ends thereof;

an actuator which has an electric motor and which changes, owing to motor force generated by the electric motor, stiffness of the stabilizer bar with respect to roll of a body of the vehicle according to an operational position of the actuator; and a control device including: a motor-force-direction·power-amount determining portion which determines a motor-force generating direction that is a direction of generation of the motor force to be generated by the electric motor and a supply power amount to the electric motor corresponding to a magnitude of the motor force; and an actuator-operation control portion which controls an operation of the actuator on the basis of the motor-force generating direction and the supply power amount.

The above-indicated form (1) shows one basic structure to which the claimable invention is applied. In the above-indicated form (1), it is to be understood that "stabilizer apparatus" is constituted by including the stabilizer bar and the actuator. The structure of the stabilizer apparatus is not particularly limited in this form (1). For instance, the stabilizer apparatus may be configured as follows: The actuator is disposed between one end of the stabilizer bar and a wheel-hold member to which the one end of the stabilizer bar is connected. A distance between the above-indicated one end of the stabilizer bar and the wheel-hold member is suitably adjusted by the actuator, whereby the stiffness of the stabilizer bar is arranged to be changeable. Alternatively, the stabilizer apparatus may be configured as follows: The stabilizer bar employed in current ordinary vehicles is divided into two, namely, a pair of stabilizer bar members between which the actuator is disposed. The pair of stabilizer bar members are rotated relative to each other by the actuator, whereby the stiffness of the stabilizer bar is arranged to be changeable. In this form (1), the structure of "actuator" is not particularly limited. The actuator may include, in addition to the electric motor, a decelerator, a mechanical brake, etc. As "electric motor", any type may be employed. For instance, there may be employed a DC brushless motor which will be explained, an induction motor, a synchronous motor, a stepping motor or a reluctance motor. From the viewpoint of motion, either a rotary motor or a linear motor may be employed. In this form (1), "control device" may be one that is constituted principally by a computer. In this instance, the above-indicated "motor-force-direction•power-amount determining portion" corresponds to a functional portion which executes processing of determining an operation target of the actuator, in detail, an operation target of the electric motor while the above-indicated "actuator-operation control portion" corresponds to a functional portion which executes processing of controlling the operation of the actuator, in detail, the operation of the electric motor, in accordance with the determined operation target.

"Motor force" described in this form (1) means force generated by the electric motor and gives the above-mentioned actuator output force. Where the electric motor is a rotary motor, a rotational torque or the like generated by the motor corresponds to the motor force. It is noted that a direction of the operation (operational direction) of the actuator corresponds to a direction of the operation (operational direction) of the electric motor (a rotational direction where the motor is the rotary motor). As explained above, since the operational direction of the actuator is determined according to a relationship between actuator output force and external input force to the actuator, "motor-force generating direction" does not necessarily coincide with the operational direction of the electric motor. Further, since the magnitude of the motor force is generally proportional to an electric power amount to be supplied to the motor (e.g., an electric current where the electric motor is controlled under a constant voltage), "supply power amount" determines the actuator output force. Namely, in this form (1), by determining the magnitude and the generating direction of a target motor force, the magnitude of a target actuator output force and the direction thereof (may be referred to as an imparting direction of the actuator output force) are determined, and the operation of the actuator is controlled based on the magnitude and the direction of the actuator output force determined as described above. When the actuator output force and the external input force are in balance with each other, the stabilizer bar is twisted by an amount that corresponds to the actuator output force and generates roll-restraining moment in accordance with the twisted amount. (It may be considered that the stabilizer apparatus generates the roll-restraining moment.) As the direction of the power to be supplied differs dependent upon the sign (+, −) of the supply power amount, for instance, it may be understood that the supply power amount represents also the motor-force generating direction. Accordingly, it may be considered that the determination of the supply power amount results in determination of the motor-force generating direction.

"Stiffness of the stabilizer bar with respect to roll of a body of the vehicle" (hereinafter may be simply referred to as "stabilizer stiffness") in this form (1) mainly means twisting stiffness, for instance. To "change the stiffness" does not mean changing stiffness as physical values of the stabilizer bar itself, but means changing so-called apparent stiffness. Mentioned concretely, to "change the stiffness" means changing a relationship between a relative displacement amount of each of the opposite ends of the stabilizer bar at which the stabilizer bar is connected to the left and right wheels, respectively, (strictly, to respective wheel-hold members such as suspension arms) and the roll-restraining moment to be generated. In detail, to "change the stiffness" means changing the magnitude of the roll-restraining moment generated by the stabilizer bar by changing the twisting amount of the stabilizer bar when the roll amount (may be referred to as the roll angle) of the vehicle body becomes equal to a certain value, conversely, changing the magnitude of the roll amount of the vehicle body when the roll-restraining moment with a certain magnitude is to be generated. In the present form (1), the stabilizer stiffness is arranged to be changeable, thereby effectively controlling the roll amount of the vehicle body when the vehicle body is undergoing the roll moment. Further, in the present form (1), the operational position of the actuator (which is a concept defined by the operational amount of the actuator from a reference state, for instance) is changed by relatively changing the actuator output force with respect to the external input force, whereby the stabilizer stiffness is obtained in accordance with the operational position of the actuator.

According to the structure described above, in the stabilizer system of the present from (1), the stabilizer bar generates the roll-restraining moment in accordance with the roll moment while, at the same time, actively controlling the effect of restraining the roll of the vehicle body in accordance with the roll moment, for instance, by changing the stabilizer stiffness. Hereinafter, such a control is referred to as "active control" for the purpose of distinguishing from a control under a specific condition which will be explained. The active control may be executed in the form of position control in which the operational position of the actuator is a direct subject to be controlled, or may be executed in the form of output force control in which the direction and the magnitude of the actuator output force are direct subjects to be controlled.

(2) The stabilizer system according to the above form (1), further comprising a drive circuit which includes a plurality of switching elements corresponding to respective phases of the electric motor, the drive circuit executing changing of an electrified phase of the electric motor corresponding to the motor-force generating direction by selectively opening and closing the plurality of switching elements and executing a pulse-electrifying control for the plurality of switching elements according to a pulse width modulation method, the drive circuit supplying power corresponding to the supply power amount by changing a duty ratio in the pulse-electrifying control, wherein the actuator-operation control portion controls an operation of the electric motor through the drive circuit.

The above-indicated form (2) is a form in which the control of the actuator, that is, the control of the electric motor is executed by a suitable drive circuit. As "drive circuit" in the form (2), there may be employed ordinary inverters, for instance.

(3) The stabilizer system according to the above form (1) or (2), wherein the electric motor is a DC brushless motor.

As the DC brushless motor has good controllability, it can be preferably used as an output-force generating source of the actuator. Further, by changing a motor-phase-connecting formation and a power-supply status of the electric motor (which will be explained in greater detail), it is possible to arbitrarily change an operation mode which will be explained. As explained below in detail, when the actuator is operated by the external input force, it is possible to obtain resistance force that depends on electromotive force generated in the motor against the operation of the actuator, even in a state in which no power is supplied from a drive source.

(4) The stabilizer system according to any one of the above forms (1)-(3), wherein the stabilizer bar includes a pair of stabilizer bar members each of which includes: a torsion bar portion disposed to extend in a width direction of the vehicle; and an arm portion which extends from the torsion bar portion so as to intersect the torsion bar portion and which is connected at a leading end thereof to one of the left and right wheels, and wherein the actuator changes, as the operational position thereof, a relative rotational angle of the torsion bar portions of the pair of stabilizer bar members, thereby changing the stiffness of the stabilizer bar with respect to the roll of the body of the vehicle.

(5) The stabilizer system according to the above form (4), wherein the actuator further includes: a decelerator for decelerating rotation of the electric motor down to relative rotation of the torsion bar portions of the pair of stabilizer bar members; and a housing which holds the electric motor and the decelerator, and wherein one end of the torsion bar portion of one of the pair of stabilizer bar members is connected to the housing so as to be unrotatable relative to the housing while one end of the torsion bar portion of the other of the pair of the stabilizer bar members is connected to an output portion of the decelerator so as to be unrotable to the output portion, thereby changing the relative rotational angle of the torsion bar portions of the pair of stabilizer bar members by the motor force generated by the electric motor.

In the above-indicated forms (4) and (5), the structure of the stabilizer bar, the configuration of the actuator and so on are concretely limited. Both of the forms (4) and (5) permit the active roll control to be effectively executed. Where the actuator is equipped with "decelerator", the mechanism of the decelerator is not particularly limited. Where the electric motor is a rotary motor and the decelerator is arranged to decelerate the rotation speed of the motor and transmit the decelerated rotation, there may be used a decelerator having a large transmission gear ratio (i.e., having a small output rotation speed with respect to an input rotation speed) and employing, for instance, a harmonic gear mechanism called as "HARMONIC DRIVE" (trademark) and also called as a strain wave gear ring mechanism, a cycloid decelerating mechanism, or a planetary gear mechanism of a multi-step type. The use of such a decelerator with a large transmission gear ratio leads to a reduction in the size of the motor and accordingly a reduction in the size of the actuator. As will be explained later, positive efficiency and negative efficiency of the actuator depend on the mechanism of the decelerator, so that it is desirable to employ a decelerator with a relatively large transmission gear ratio in a case of constructing a system which takes account of and effectively utilizes the negative efficiency. In this respect, the harmonic gear mechanism is preferable among the mechanisms illustrated above. Where the harmonic gear mechanism is employed, it is desirable to employ one whose transmission gear ratio (a ratio of the output rotation speed to the input rotation speed) is in a range from about 1/100 to about 1/300.

(11) The Stabilizer System According to any One the Above Forms (1)-(5), wherein the control device further includes a target-operational-position determining portion which determines a target operational position of the actuator, wherein the motor-force-direction•power-amount determining portion determines the motor-force generating direction and the supply power amount on the basis of a supply-power-component sum that is a sum of (a): a displacement-amount-dependent supply-power component determined depending upon a displacement amount of the operational position of the actuator with respect to a neutral position; and (b) a deviation-dependent supply-power component based on operational-position deviation which is deviation of the operational position with respect to the target operational position, wherein the actuator-operation control portion controls an operation of the actuator on the basis of the target operational position, and wherein the motor-force-direction•power-amount determining portion includes a power-amount limit section which limits the supply power amount when the supply-power-component sum becomes a value that is closer to the displacement-amount-dependent supply-power component than a prescribed threshold in a specific situation in which a direction of generation of the motor force based on the displacement-amount-dependent supply-power component and a direction of generation of the motor force based on the deviation-dependent supply-power component differ from each other.

The above-indicated form (11) relates to a system which executes the above-mentioned active control on the basis of the operational position of the actuator, namely, relates to a system which executes the active control by the aforementioned positional control. More specifically described, in the present form (11), the operational position of the actuator is a direct subject to be controlled, and the active control is carried out by suitably controlling the generation direction of the motor force of the electric motor and the electric power to be supplied to the electric motor, in order to make the operational position of the actuator equal to a target operational position at which desired stabilizer stiffness is obtained.

In the active control in which the operational position of the actuator is a direct subject to be controlled, the stabilizer stiffness is set to make the roll amount of the vehicle body equal to a desired value in accordance with the roll moment while, at the same time, the roll-restraining moment which counters the roll moment is set. In this instance, the operational position of the actuator and the roll-restraining moment are correlated with each other. In the meantime, for keeping the roll amount of the vehicle constant against certain roll moment, the actuator output force needs to be kept at a constant value against the external input force that depends on the roll moment. Therefore, for maintaining a certain operational position to guarantee the actuator output force in accordance with the operational position of the actuator, certain motor force is steadily or rudimentarily required. In a normal state in which no roll moment acts on the vehicle body, there is no need of generating the roll-restraining moment. However, as the operational position of the actuator is separated away from a neutral position which is the operational position of the actuator in the normal state, large roll-restraining moment is required. Accordingly, the output force of the actuator changes in accordance with the neutral-position displacement amount which is a displacement amount of the operational position of the actuator with respect to the neutral position. That is, the above-indicated "displacement-amount-dependent supply power component" may be regarded as electric power to the supplied to the electric motor (i.e., "operational-position-maintaining power" described later), for permitting the electric motor to exhibit steady or fundamental motor force necessary for maintaining the operational position of the actuator.

In the above-indicated active control, because the stabilizer stiffness is changed in accordance with the roll moment, there is set target operational position of the actuator in accordance with the roll moment. To this end, if the target operational position is changed, the operational position of the actuator should be changed in response to that change. In short, the electric power to be supplied to the electric motor for permitting the electric motor to exhibit the motor force necessary for changing the operational position of the actuator is the aforementioned "deviation-dependent supply power component". This component may be regarded as a relative component with respect to the displacement-amount-depending supply power component, that is, as electric power for correcting the above-indicated steady or fundamental motor force so as to increase or decrease on the basis of the relationship between the target operational position and the current operational position of the actuator (as "corrective power" described below).

In the above-indicated form (11), the motor-force generating direction and the supply power amount are determined on the basis of the aforementioned "supply-power-component sum" which is sum of the above-indicated two supply-power components. In detail, each of the supply-power components and the supply-power-component sum may be considered to have different signs (+, −) depending upon the operational direction of the electric motor which corresponds to the operational direction of the actuator. Accordingly, the supply-power-component sum may be obtained by simply adding the two supply-power components together, and the obtained supply-power-component sum may be determined as the supply power amount, for instance. Depending upon the sign of the supply-power-component sum as the supply power amount, the motor-force generating direction may be determined.

The determination of the motor-force generating direction and the supply power amount described above is regarded as determination by a feed-back control technique based on deviation of the operational position of the actuator, in detail, by a technique according to a PI control rule or a PDI control rule. The above-indicated active control may be executed in a control form employing such techniques. The active control can be simply carried out by employing such techniques. Where such techniques are employed, the displacement-amount-depending supply power component corresponds to a component specified by an integral term (I term) while the deviation-dependent supply power component corresponds to a component specified by a proportional term (P term) or a sum of the proportional term and a differential term (D term), as described below.

In controlling the actuator, it is desirable to take account of the positive efficiency and the negative efficiency of the actuator as will be explained in detail. "Negative efficiency" of the actuator means a ratio of the motor force necessary for inhibiting the actuator from being operated by the external input force, to the external input force. "Positive efficiency" of the actuator means a ratio of the motor force necessary for permitting the actuator to be operated against the external input force, to the external input force. Therefore, the displacement-amount-depending supply power component which is a component of the electric power to be supplied to the electric motor for permitting the electric motor to exhibit the steady or fundamental motor force necessary for maintaining the operational position of the actuator may conform to the negative efficiency. In the arrangement, in one turning motion of the vehicle, power saving of the stabilizer system is attained at a middle period of the turning in which the roll moment is generally constant. At a final period of the turning in which the roll moment is on the decrease, the stabilizer system is excellent in the follow-up property relating to the decrease of the roll-restraining moment. Where the displacement-amount-dependent supply power component conforms to the negative efficiency, the motor needs to exhibit the motor force conforming to the positive efficiency at an initial period of the turning in which the roll moment is on the increase. Therefore, the supply power larger than a difference between the motor force according to the positive force and the motor force according to the negative force may be guaranteed by the aforementioned deviation-dependent supply power component.

In executing the active control as explained above, there may occur a situation in which good control can not be executed if the active control is executed even when the motor-force generating directions respectively based on the displacement-amount-dependent supply power component and the deviation-dependent supply power component explained above differ from each other. More specifically explained, at the final period of the turning in which the roll moment is on the decrease, for instance, the motor-force generating direction based on the displacement-amount-dependent supply power component (hereinafter may be referred to as "displacement-amount-dependent direction) coincides with a direction corresponding to a direction that permits the operational position of the actuator to separate or move away from the neutral position (hereinafter each of those directions may be referred to as "counter-neutral direction). On the contrary, the motor-force generating direction based on the deviation-dependent supply power component (hereinafter may be referred to as "deviation-dependent direction") coincides with a direction corresponding to a direction that permits the operational position of the actuator to come closer to the neutral position (hereinafter each of those directions may be referred to as "neutral direction"). In such an instance, when the vehicle suffers from disturbance external input force in the counter-neutral direction, in particular, due to irregularities or bumpiness of the road surface, the operation of the actuator in the neutral direction is inhibited, and the ride comfort of the vehicle my be lowered for reasons that a state in which the stabilizer stiffness is high continues for a relatively long time, for instance. Where the vehicle intermittently suffers from such disturbance external input force, for instance, the displacement-amount-dependent supply power component is prevented from decreasing while the deviation-dependent supply power component varies. In consequence, the generation direction of the motor force based on a supply-power-component sum that is a sum of those two components, that is, the generation direction of the motor force as a command for controlling the electric motor, alternately changes between the neutral direction and the counter-neutral direction plural times. Depending upon the degree of the alternate changes, there may be caused various problems such as overloading of the actuator, occurrence of abnormal noise and vibration, deterioration in the power consumption characteristic of the actuator.

In view of the above, in the present form (11), there is supposed a situation in which good control cannot be executed by the aforementioned active control. In the present form (11), a situation in which the above-indicated displacement-amount-dependent direction and the above-indicated deviation-dependent direction differ from each other is identified as a specific situation, and a control which is distinct from the active control is executed to prevent or suppress such a situation. In detail, the supply power amount is arranged to be limited when the supply-power-component sum becomes a value that is closer to the displacement-amount-dependent supply power component than the prescribed threshold, namely, when the supply-power-component sum becomes a value that is on the side of the counter-neutral direction with respect to the threshold, in the specific situation. In this form (11), therefore, the operation of the actuator in which the operational position of the actuator is directed toward the counter-neutral direction is restrained. As a result, the readiness of the operation of the actuator is made different depending upon its operational direction. More specifically described, the actuator is readily operated in a direction toward the neutral position, promoting return to the normal state of the stabilizer apparatus. Thus, the ride comfort of the vehicle is improved. Because the supply power can be made relatively small, it is possible to realize a stabilizer system with comparatively small power consumption. Moreover, by limiting the supply power amount such that the generation direction of the motor force does not coincide with the counter-neutral direction in the specific situation, the above-mentioned alternate change of the motor-force generating direction between the neutral position and the counter-neutral direction can be effectively prevented. It is noted that the control executed while identifying, as the specific situation, the situation in which the above-indicated displacement-amount-dependent direction and the above-indicated deviation-dependent direction differ from each other is hereinafter referred to as "under-supply-power-component-direction-different-situation control".

(12) The stabilizer system according to the above form (11), wherein the displacement-amount-dependent supply-power component corresponds to operational-position-maintaining power which is power that permits the electric motor to exhibit the motor force necessary for maintaining the operational position of the actuator, and the deviation-dependent supply-power component corresponds to corrective power which corrects the operational-position-maintaining power for changing the operational position of the actuator.

(13) The stabilizer system according to the above form (11) or (12), wherein the displacement-amount-dependent supply-power component corresponds to power that permits the electric motor to exhibit the motor force determined based on negative efficiency of the actuator.

(14) The stabilizer system according to any one of the above forms (11)-(13), wherein the motor-force-direction•power-amount determining portion determines the motor-force generating direction and the supply power amount according to one of a PI-control rule and a PDI-control rule which are based on the operational-position deviation, and wherein the displacement-amount-dependent supply-power component is specified by an integral term while the deviation-dependent supply-power component is specified by a proportional term where the motor-force generating direction and the supply power amount are determined according to the PI-control rule or by a sum of the proportional term and a differential term where the motor-force generating direction and the supply power amount are determined according to the PDI-control rule.

Each of the above-indicated three forms (12)-(14) is a form to which is added a limitation relating to the displacement-amount-dependent supply power component and the deviation-dependent supply power component. The significance of those forms (12)-(14) has been explained in the above form, and a detailed explanation of which is dispensed with.

(15) The stabilizer system according to any one of the above forms (11)-(14), wherein the prescribed threshold is set at 0.

(16) The stabilizer system according to any one of the above forms (11)-(14), wherein the prescribed threshold is set at a value that is on one of opposite sides of 0 which is a side of the deviation-dependent supply-power component.

(17) The stabilizer system according to any one of the above forms (11)-(14), wherein the prescribed threshold is set at a value that is on one of opposite sides of 0 which is a side of the displacement-amount-dependent supply-power component.

The above-indicated forms (15)-(17) are forms showing variations relating to the aforementioned threshold in the under-supply-power-component-direction-different-situation control. "Setting the threshold at 0" means setting the threshold at a value at which the supply-power-component sum is neither in the neutral direction nor the counter-neural direction. "Setting the threshold at a value that is on one of opposite sides of 0 which is the side of the deviation-dependent supply-power component" means setting the threshold at a value at which the generation direction of the motor force coincides with the same direction as the generation direction of the motor force based on the deviation-dependent supply-power component. "Setting the threshold at a value that is on one of opposite sides of 0 which is a side of the displacement-amount-dependent supply-power component" means setting the threshold at a value at which the generation direction of the motor force coincides with the same direction as the generating direction of the motor force based on the displacement-amount-dependent supply-power component. The threshold is arbitrarily determined to be one of those values, and can be set at an appropriate value while taking account of the relationship with the following forms that relate to a limitation of the supply power amount. In a case wherein the threshold is not set at 0, it is desirable to set the threshold at a value close to 0 to a certain degree.

(18) The stabilizer system according to any one of the above forms (11)-(17), wherein the power-amount limit section determines the supply power amount to be a prescribed fixed value.

(19) The stabilizer system according to any one of the above forms (11)-(18), wherein the power-amount limit section determines the supply power amount to be a value of the prescribed threshold.

(20) The stabilizer system according to any one of the above forms (11)-(18), wherein the power-amount limit section determines the supply power amount to be 0.

Each of the above-indicated forms (18)-(20) is a form to which is added a limitation of the supply power amount in the under-supply-power-component-direction-different-situation control. Where the supply power amount is limited to a fixed value, the under-supply-power-component-direction-different-situation control can be simplified. Where the supply power amount is set at a value of the prescribed threshold, it is possible to make a variation in the supply power amount relatively small in a case in which the supply-power-component sum repeatedly varies, i.e., repeatedly increases or decreases. Where the supply power amount is set at 0, it is possible to construct a stabilizer system which is excellent in the standpoint of power saving. Where the supply power amount is set at 0 or a value that is on one of opposite sides of 0 which is on the side of the deviation-dependent supply-power component, that is, where the supply power component is limited such that the generation direction of the motor force does not coincide with the counter-neutral direction, it is possible to prevent a variation in the motor-force generating direction even if the generation direction of the motor force based on the supply-power-component sum alternately changes between the neutral direction and the counter-neutral direction plural times.

As an effective form relating to a combination of the variation of the threshold explained above and the limitation of the supply power amount, it is possible to employ, for instance, a form in which the prescribed threshold is set at 0 and the supply power amount is limited to 0. This form realizes a relatively simple under-supply-power-component-direction-different-situation control. Further, it is possible to employ a form in which the prescribed threshold is set at a value that is on one of opposite sides of 0 which is the side of the deviation-dependent supply-power component and the supply power amount is limited to 0. In this form, the power supply amount is 0 in cases where the supply-power-component sum is a comparatively small value in the neutral direction, whereby a time period during which the motor-force generating direction coincides with the neutral direction can be made relatively short. Accordingly, it is possible to restrain overshooting of the operational position of the actuator due to inertia or the like. Further, where the prescribed threshold is set at a value that is on the side of the displacement-amount-dependent supply power component and the supply power amount is limited to 0 or a value of the prescribed threshold, the motor force can be generated in the counter-neutral direction in cases where the supply-power-component sum is a comparatively small value in the counter-neutral direction, thereby more effectively restraining the overshooting mentioned above.

(21) The stabilizer system according to any one of the above forms (11)-(18) and (20), wherein the electric motor is operable in at least one operation mode selected from: a phase-change-executing no-power-supply mode in which changing of an electrified phase is executed so as to permit the motor-force generating direction to coincide with the direction of generation of the motor force based on the deviation-dependent supply-power component while no power is supplied to the electric motor; and a phase-interconnection mode in which respective phases of the electric motor is connected to each other, and wherein the actuator-operation control portion includes an operation-mode-determination control section which determines the operation mode of the electric motor to be the at least one operation mode and thereby controls an operation of the electric motor, when the supply power amount is limited by the power-amount limit section.

(22) The stabilizer system according to the above form (21), wherein the operation-mode-determination control section determines the operation mode of the electric motor to be the phase-change-executing no-power-supply mode and thereby controls the operation of the electric motor.

(23) The stabilizer system according to the above form (21), wherein the operation-mode-determination control section determines the operation mode of the electric motor to be the phase-interconnection mode and thereby controls the operation of the electric motor.

(24) The stabilizer system according to the above form (21), wherein the electric motor is operable in both of the phase-change-executing no-power-supply mode and the phase-interconnection mode, and the operation-mode-determination control section selectively determines the operation mode of the electric motor to be one of the phase-change-executing no-power-supply mode and the phase-interconnection mode and thereby controls the operation mode of the electric motor.

Each of the above-indicated forms (21)-(24) is a form that limits the operation mode of the electric motor where the supply current amount is limited to 0 in the specific situation. "Operation mode" of the electric motor stated herein can be considered as an operation form of the electric motor which depends on the motor-phase-connecting formation and the power-supply status of the electric motor. Here, "motor-phase-connecting formation" means a formation relating to changing of phases of the motor in supplying electric power from a power source to the motor, connection between input lines of the respective phases of the motor and the power source, interrelation among the input lines of the respective phases, etc. The motor-phase-connecting formation will be explained in greater detail. "Power-supply status" means, for instance, a status as to whether or not electric power is under supply to the motor, how much power is supplied, and when or at what timing electric power is supplied. As the operation mode, various modes can be set depending upon the motor-phase-connecting formation and the power-supply status, and the individual modes can have respective peculiar or inherent characteristics. Accordingly, by changing the operation mode of the electric motor while taking advantage of the inherent characteristics of the respective modes, the characteristics of the stabilizer system can be variously changed.

The operation mode is classified broadly into two modes. One of the two modes is a "power-supplying control mode" in which the amount of the electric power supplied to the electric motor is controlled while changing the phases of the electric motor in supplying electric power to the motor, thereby controlling the operation of the motor. The power-supplying control mode is an operation mode employed in the active control indicated above. Further, the power-supplying control mode may be understood as an operation mode that aims at actively changing the stabilizer stiffness to a desired value by controlling the actuator. The other of the two modes is a "no-power-supply mode" in which no power is supplied from the power source to the electric motor. The no-power-supply mode is an operation mode which is employed in a case where the active control of the actuator is not intended. Where the no-power-supply mode is employed, the power consumption by the stabilizer system can be reduced.

The no-power-supply mode can be classified into three modes. One of the three modes is an "all-phase interception mode". Generally, this mode is an operation mode wherein the input lines of the respective phases of the electric motor and the power source are disconnected from each other, in other words, an operation mode wherein each phase of the motor is placed in an open state. In this operation mode, no electromotive force (which may be considered as "counter-electromotive force) is generated in the electric motor and substantially no braking effect is obtained. Accordingly, by employing this operation mode, the stabilizer bar exhibits little stiffness, and therefore the vehicle is in a state closer to that in which the vehicle is not equipped with the stabilizer. In this respect, under this operation mode, independency on the right side and the left side of the vehicle in a situation wherein there acts external force that moves the right-side and left-side wheels vertically in opposite directions, e.g., in a situation wherein the right-side wheel or left-side wheel runs onto a projection or bump. Therefore, the ride comfort as felt by vehicle passengers during traveling on a bumpy road, a mogul road, or the like can be improved.

Another one of the three modes is a "phase-interconnection mode" employed in the above-indicated forms. The phase-interconnection mode may be considered as an operation mode wherein the motor-phase-connecting formation is a formation in which the input lines of the electric motor are connected to each other. Where the phases of the motor are connected to each other without any resistance intervened, namely, where the phases are short-circuited, there can be obtained effect of so-called short-circuit braking. The short-circuit braking is one type of braking utilizing electromotive force generated in the motor, and assures relatively large braking effect among braking utilizing the electromotive force. Owing to the short-circuiting effect, the stabilizer is nearly locked with respect to the actuator operation with a relatively high operational speed, thereby enabling the stabilizer apparatus to exhibit a function close to that of a conventional stabilizer apparatus in which the stabilizer stiffness cannot be changed. Where the phases are connected to each other with resistances intervened, medium-degree braking effect can be obtained. Though the medium-degree braking provides braking force smaller than that provided by the short-circuit braking, a part of the electromotive force is consumed by the resistances, thereby inhibiting generation of heat in the electric motor.

Still another one of the above-indicated three modes of the no-power-supply mode is a "phase-change-executing no-power-supply mode" employed in the above-indicated forms. The phase-change-executing no-power-supply mode is an operation mode in which no power is actually supplied from the power source though the changing of the electrified phase of the motor is executed corresponding to the commanded motor-force generating direction, and this mode may be regarded as an ultimate mode of the power-supplying control mode. The present mode is excellent in readiness and responsiveness with respect to transition to the power-supplying control mode. As will be explained below, where the no-power supply mode is employed, it is possible to selectively realize a status in which the braking effect utilizing the electromotive force is obtained and a status in which the braking effect utilizing the electromotive force is not obtained, depending upon the way of changing the electrified phase of the motor. More concretely described, where the electric motor is operated in the same direction as the commanded motor-force generating direction, no electromotive force is generated, resulting no braking effect. On the contrary, where the eclectic motor is operated in a direction opposite to the commanded motor-force generating direction, there is generated the electromotive force to provide the braking effect.

By taking advantage of the characteristics of the operation mode explained above, at least one of the phase-interconnection mode and the phase-change-executing no-power-supply mode is executed in the above-indicated forms where the supply power amount is limited to 0 in the specific situation. Where the phase-interconnection mode is employed, a large degree of damping effect can be imparted to the stabilizer apparatus utilizing the relatively large braking effect described above, thereby improving the stability of the vehicle and suppressing the overshooting explained above with higher reliability. Where the phase-change-executing no-power supply mode is employed, the electrified phase of the motor may be changed such that the motor-force generating direction coincides with the generation direction of the motor force based on the deviation-dependent supply-power component, for instance. In this instance, when the actuator is operated in the neutral direction by the external output force, no resistance is imparted to the operation of the actuator in the neutral direction. On the contrary, when the actuator is operated in the counter-neutral direction, there is imparted a certain degree of resistance to the operation of the actuator in the counter-neutral direction, providing the damping effect with respect to the counter-neutral direction. That is, the readiness with which the actuator is operated differs depending upon the operation direction thereof, thereby assuring good balance between the smoothness of the return to the neutral position and the stability with respect to operation in the counter-neutral direction. Moreover, if the electrified phase of the motor is changed such that the motor-force generating direction coincides, all the time, with the same direction as a direction that corresponds to the operational direction of the actuator, no resistance is imparted to the operation of the actuator which results from the external input force applied thereto. Namely, the ride comfort as felt by the vehicle passengers can be improved.

In the above-indicated form (24) wherein the phase-interconnection mode and the phase-change-executing no-power supply mode is selectively employed, the selection may be changed depending upon the vehicle running condition such as the vehicle running speed and the surface condition of the road on which the vehicle is running such as the degree of the irregularities of the road surface. More specifically explained, when the vehicle running speed is large, for instance, the phase-connection mode may be selected in view of the vehicle stability. When the vehicle running speed is small, on the other hand, the emphasis is put on the ride comfort of the vehicle and accordingly the phase-change-executing no-power supply mode may be selected.

(25) The stabilizer system according to one of the above forms (21)-(24), further comprising a drive circuit which includes a plurality of switching elements corresponding to respective phases of the electric motor, the drive circuit executing changing of an electrified phase of the electric motor corresponding to the motor-force generating direction by selectively opening and closing the plurality of switching elements and executing a pulse-electrifying control for the plurality of switching elements according to a pulse width modulation method, the drive circuit supplying power corresponding to the supply power amount by changing a duty; ratio in the pulse-electrifying control.

(26) The stabilizer system according to the above form (25), wherein the electric motor is operable at least in, the phase-change-executing no-power-supply mode, wherein the drive circuit establishes the phase-change-executing no-power-supply mode by setting the duty ratio in the pulse-electrifying control at 0 while executing the changing of the electrified phase by the plurality of switching elements, and wherein the actuator-operation control portion realizes the operation of the electric motor in the phase-change-executing no-power-supply mode by the drive circuit.

(27) The stabilizer system according to the above form (26), wherein the plurality of switching elements are disposed so as to form a pair on positive and negative sides of a power source for each of the phases of the electric motor and the drive circuit has a plurality of reflux diodes each of which is disposed in parallel with a corresponding one of the plurality of switching elements, and wherein the drive circuit is arranged such that any two switching elements of the plurality of switching elements which are respectively on the positive side and the negative side and which cooperate with each other corresponding to the changing of the electrified phase are maintained in one and the other of an open state and a closed state, whereby the drive circuit establishes the phase-change-executing no-power-supply mode.

(28) The stabilizer system according to any one the above forms (25)-(27), wherein the plurality of switching elements are disposed so as to form a pair on positive and negative sides of a power source for each of the phases of the electric motor and the drive circuit has a plurality of reflux diodes each of which is disposed in parallel with a corresponding one of the plurality of switching elements, wherein the drive circuit establishes the phase-interconnection mode by placing all of the plurality of switching elements disposed on the positive or negative side, in a closed state, and wherein the actuator-operation control portion realizes the operation of the electric motor in the phase-interconnection mode by the drive circuit.

Each of the above-indicated forms (25)-(28) is a form in which, where the stabilizer system is equipped with a drive circuit such as inverters and the drive circuit controls electric power to be supplied to the motor, at least one of the above-indicated phase-interconnection mode and the above-indicated phase-change-executing no-power supply mode is established by the drive circuit. The use of the drive circuit such as the inverters makes it possible to change the operation mode of the motor with ease. The changing of the switching elements will be explained in detail referring to specific examples, and a detailed explanation of which is not give here.

(29) The stabilizer system according to any one of the above forms (11)-(28), wherein the target-operational-position determining portion determines the target operational position on the basis of a roll-moment index amount indicative of roll moment acting on the body of the vehicle.

The above-indicated form (29) is a from to which is added a limitation as to the determination of a value of control target in the active control. In the active control, the actuator is desirably controlled according to the roll moment acting on the vehicle body. This form attains the inherent original object of the active control to a sufficient extent. "Roll-moment index amount" stated here is a parameter which directly or indirectly indicates the magnitude of the roll moment that the vehicle body receives. Generally speaking, the roll-amount index amount is various sort of physical quantity capable of indicating what degree of magnitude of roll moment the vehicle receives. Explained more specifically, the roll-moment index amount corresponds to the steering angle of the vehicle, the lateral acceleration occurring in the vehicle body, the yaw rate occurring in the vehicle, cornering force acting on the vehicle, lateral force, slip angle of the vehicle, in addition to the roll moment per se. Among those, the lateral acceleration and the yaw rate are preferable as a parameter on which the aforementioned active control depends, for the reasons that the lateral acceleration and the yaw rate are comparatively easily detected and estimated, for instance.

(41) The stabilizer system according to any one the above forms (1)-(5), wherein the motor-force-direction power-amount determining portion determines the motor-force generating direction based own an operational direction of the actuator in a specific situation in which the supply power amount is expected to be 0, and wherein the actuator-operation control portion includes an operation-mode-determination control section which determines, in the specific situation, an operation mode of the electric motor to be a phase-change-executing no-power-supply mode in which changing of an electrified phase of the electric motor is executed corresponding to the motor-force generating direction while no power is supplied to the electric motor, and thereby controls an operation of the electric motor.

In the above-indicated form (41), a situation in which the active control need not be executed such as when the vehicle is running straightforward or when the roll moment is small, a situation in which it is desirable that the active control be not executed, and the like are identified as a specific situation, and the operation mode of the electric motor is placed into the phase-change-executing no-power-supply mode in the specific situation. In other words, there is provided a control dead zone in the active control, for instance, and the electric motor is operated under the phase-change-executing no-power-supply mode in the control dead zone.

As the change pattern of the electrified phase in the phase-change-executing no-power-supply mode, there exist two patterns depending upon in which direction the motor force is generated if the electric power is supplied to the motor, as in the power-supplying control mode mentioned above. As explained above or as will be explained in detail, in the phase-change-executing no-power-supply mode, no braking effect owing to the electromotive force is obtained when the direction in which the motor is operated and the change pattern of the electrified phase coincide with each other, namely, when the direction in which the motor is operated by the external input force and the motor-force generating direction which depends on the change pattern of the electrified phase coincide with each other. On the contrary, the braking effect utilizing the electromotive force is obtained when the direction in which the motor is operated and the change pattern of the electrified phase do not coincide with each other, namely, when the direction in which the motor is operated and the motor-force generating direction of the electrified phase are opposite to each other. The present form may be regarded as a form in which the readiness of the operation of the actuator is made different depending upon the operational direction by utilizing the characteristics of the phase-change-executing no-power-supply mode. The present form can appropriately cope with a state in which the actuator is compelled to be operated due to influences of the external input force in the specific situation. In the stabilizer system according to the present form, therefore, the vehicle stability, the ride comfort and so on are good, assuring high utility of the system. The control executed in the specific situation wherein the supply power amount is expected to 0 is designated as "under-active-control-unnecessary-situation control", and hereinafter may be referred as such. Accordingly, the present form is one form of the under-active-control-unnecessary-situation control.

The above-indicated form (41) may be arranged such that the changing of the electrified phase in the phase-change-executing no-power-supply mode is suitably executed, assuming the operation in that mode. Namely, the present form may be arranged such that the change pattern of the electrified phase is changed arbitrarily or based on a certain condition. By changing the characteristics of the stabilizer apparatus in the specific situation described above, the vehicle stability, the ride comfort and so on in the specific situation can be made more proper.

(42) The stabilizer system according to the above form (41), further comprising a drive circuit which includes a plurality of switching elements corresponding to respective phases of the electric motor, the drive circuit executing the changing of the electrified phase corresponding to the motor-force generating direction by selectively opening and closing the plurality of switching elements and executing a pulse-electrifying control for the plurality of switching elements according to a pulse width modulation method, the drive circuit supplying power corresponding to the supply power amount by changing a duty ratio in the pulse-electrifying control, and wherein the drive circuit establishes the phase-change-executing no-power-supply mode by setting the duty ratio in the pulse-electrifying control at 0 while executing the changing of the electrified phase by the plurality of switching elements, and wherein the actuator-operation control portion realizes the operation of the electric motor in the phase-change-executing no-power-supply mode by the drive circuit.

(43) The stabilizer system according to the above form (42), wherein the plurality of switching elements are disposed so as to form a pair on positive and negative sides of a power source for each of the phases of the electric motor and the drive circuit has a plurality of reflux diodes each of which is disposed in parallel with a corresponding one of the plurality of switching elements, and wherein the drive circuit is arranged such that any two switching elements of the plurality of switching elements which are respectively on the positive side and the negative side and which cooperate with each other corresponding to the changing of the electrified phase are maintained in one and the other of an open state and a closed state, whereby the drive circuit establishes the phase-change-executing no-power-supply mode.

Each of the above-indicated two forms (42), (43) is a form in which, when the stabilizer system is equipped with the drive circuit by which the power to be supplied to the motor is controlled, the above-indicated phase-change-executing no-power-supply mode is realized by the drive circuit. The use of the drive circuit makes it possible to change the operation mode of the motor with ease. The changing of the switching elements will be explained in detail referring to specific examples, a detailed explanation of which is omitted here.

(44) The stabilizer system according to any one of the above forms (41)-(43), wherein the motor-force-direction•power-amount determining portion determines, in the specific situation, the motor-force generating direction to be the same as a direction that corresponds to the operational direction of the actuator.

(45) The stabilizer system according to any one of the above forms (41)-(43), wherein the motor-force-direction•power-amount determining portion determines, in the specific situation, the motor-force generating direction to be opposite to a direction that corresponds to the operational direction of the actuator.

Each of the above-indicated two forms (44), (45) is a form in which is limited a relationship between the change pattern of the electrified phase selected in the phase-change-executing no-power supply mode and the operational direction of the actuator, in the above-indicated under-active-control-unnecessary-situation control. When the actuator is operated by the external input force, the resistance against the operation can be made small, by permitting the operational direction of the actuator, i.e., the operational direction of the motor and the change pattern of the electrified phase as the command to the motor to agree with each other. As a result, the actuator can be easily operated by the external input force. Accordingly, the stabilizer stiffness is not exhibited even when the vehicle suffers from the disturbance input force such as the irregularities of the road surface in the specific situation, whereby the ride comfort of the vehicle is improved. On the contrary, a certain degree of resistance can be imparted against the operation of the actuator, by making the change pattern of the electrified phase and the operational direction of the motor opposite to each other, namely, by permitting the change pattern of the electrified phase and the operational direction of the motor to disagree with each other. Accordingly, a certain degree of the stabilizer stiffness is exhibited even when the actuator is operated by the external input force, making it possible to improve the vehicle stability.

(46) The stabilizer system according to any one of the above forms (41)-(45), wherein the motor-force-direction•power-amount determining portion is arranged to changeably determine, in the specific situation, the motor-force generating direction to be the same as or opposite to the direction that corresponds to the operational direction of the actuator.

The above-indicated form (46) is a form in which the change pattern of the electrified phase in the phase-change-executing no-power-supply mode can be arbitrarily or suitable selected in the above-indicated under-active-control-unnecessary-situation control. This form effectively utilizes the difference in the stabilizer stiffness according to the agreement or the disagreement of the change pattern of the electrified phase and the operational direction of the actuator. According to this form, the features of the stabilizer apparatus can be characterized.

(47) The stabilizer system according to the above form (46), wherein the motor-force-direction•power-amount determining portion determines, in the specific situation, the motor-force generating direction to vary dependent upon which one of ride comfort of the vehicle and stability of the body of the vehicle is emphasized, and wherein the motor-force-direction•power-amount determining portion includes a desired-characteristic-dependent determining section which determines the motor-force generating direction to be the same as the direction that corresponds to the operational direction of the actuator where the ride comfort of the vehicle is emphasized and which determines the motor-force generating direction to be opposite to the direction that corresponds to the operational direction of the actuator where the stability of the body of the vehicle is emphasized.

The above-indicate form (47) is a form in which the change pattern of the electrified phase of the motor in the phase-change-executing no-power-supply mode is selected on the basis of the vehicle characteristics desired by the vehicle designers, the vehicles operators (the vehicle drivers) such as the ride comfort and the vehicle stability. In this form, the stabilizer apparatus can be characterized in accordance with the desired vehicle characteristics.

(48) The stabilizer system according to the above form (46) or (47), wherein the motor-force-direction•power-amount determining portion includes a neutral-position-dependent determining section which determines, in the specific situation, the motor-force generating direction: to be the same as the direction that corresponds to the operational direction of the actuator where the operational direction of the actuator coincides with a direction that permits the operational position of the actuator to come closer to a neutral position; and to be opposite to the direction that corresponds to the operational direction of the actuator where the operational direction of the actuator coincides with a direction that permits the operational position of the actuator to separate or move away from the neutral position.

The above-indicated form (48) is a form in which the change pattern of the electrified phase of the motor in the phase-change-executing no-power-supply mode is selected on the basis of the operational direction of the actuator with respect to the neutral position. According to this form, when the actuator is operated in the neutral direction by the external input force, the resistance against the operation in the neutral direction can be made small. On the other hand, when the actuator is operated in the counter-neutral direction, the resistance against the operation in the counter-neutral direction can be made large. Therefore, the present mode satisfies both of the easiness of return to the neutral position and the stability of the vehicle body when the roll moment acts thereon.

(49) The stabilizer system according to any one of the above forms (41)-(48), wherein the control device further includes a specific-situation identifying portion which identifies the specific situation.

(50) The stabilizer system according to the above form (49), wherein the specific-situation identifying portion identifies the specific situation when a roll-moment index amount indicative of roll moment acting on the body of the vehicle is not greater than a prescribed threshold.

(51) The stabilizer system according to the above form (49) or (50), wherein the specific-situation identifying portion identifies the specific situation when the vehicle is running straightforward.

Each of the above-indicated three forms (49)-(51) is a form in which is added a limitation as to the identification of the aforementioned specific situation. In the forms indicated above, in view of the fact that the need of executing the active control is small and it is desirable not to execute the active control in a state in which the roll moment is comparatively small and in a state in which the vehicle is running straightforward, the above-indicated under-active-control-unnecessary-situation control is executed in such states. The state in which the roll moment is small and the state in which the vehicle is running straightforward are concepts that overlap each other. Further, where the specific situation is identified based on the roll-moment index amount, it is possible to identify the specific situation by various parameters explained above. In this connection, where the target operational position in the active control is determined on the basis of the above-indicated lateral acceleration, yaw rate and so on, and the above-indicated supply-power-component sum, supply power amount and so on are determined the target operational position, the target operational position, the supply-power-component sum, the supply power amount and so on can be parameters which indirectly indicate the roll moment, so that the specific situation can be identified based on the target operational position, etc., as the roll-moment index amount.

(52) The stabilizer system according to any one of the above forms (41)-(51), wherein the motor-force-direction•power-amount determining portion determines the motor-force generating direction and the supply power amount on the basis of a roll-moment index amount indicative of roll moment acting on the body of the vehicle.

The above-indicated form (52) is a form to which is added a limitation as to determination of a value of control target in the active control. As explained before, this form sufficiently attains the inherent object of the active control. As "roll-amount index amount", various parameters mentioned above may be employed. Where the active control is executed by the above-indicated positional control, the target operational position of the actuator may be determined, and then the motor-force generating direction and the supply power amount may be determined on the basis of the target operational position.

(61) The stabilizer system according to any one of the above forms (1)-(5), further comprising a means for differentiating operation readiness which differentiates readiness of operation of the actuator depending upon the operational direction thereof in a specific situation in which a status of the stabilizer system is specific.

(62) The stabilizer system according to the above form (61), wherein the control device further includes a target-operational-position determining portion which determines a target operational position of the actuator, wherein the motor-force-direction•power-amount determining portion determines the motor-force generating direction and the supply power amount on the basis of a supply-power-component sum that is a sum of (a): a displacement-amount-dependent supply-power component determined depending upon a displacement amount of the operational position of the actuator with respect to a neutral position; and (b) a deviation-dependent supply-power component based on operational-position deviation which is deviation of the operational position with respect to the target operational position, wherein the actuator-operation control portion controls the operation of the actuator on the basis of the target operational position, and wherein the means for differentiating operation readiness is constituted such that the motor-force-direction•power-amount determining portion includes a power-amount limit section which limits the supply power amount when the supply-power-component sum becomes a value that is closer to the displacement-amount-dependent supply-power component than a prescribed threshold in a situation, as the specific situation, in which a direction of generation of the motor force based on the displacement-amount-dependent supply-power component and a direction of generation of the motor force based on the deviation-dependent supply-power component differ from each other.

(63) The stabilizer system according to the above form (61), wherein the motor-force-direction•power-amount determining portion determines the motor-force generating direction on the basis of an operational direction of the actuator in a situation, as the specific situation, in which the supply power amount is expected to be 0, and wherein the means for differentiating operation readiness is constituted such that the actuator-operation control portion includes an operation-mode-determination control section which determines, in the specific situation, an operation mode of the electric motor to be a phase-change-executing no-power-supply mode in which changing of an electrified phase of the electric motor is executed corresponding to the motor-force generating direction while no power is supplied to the electric motor, and thereby controls an operation of the electric motor.

The above-indicated firms (61)-(63) are forms which indicate that each of the foregoing under-supply-power-component-direction-different-situation control and the foregoing under-active-control-unnecessary-situation control can be superordinated as the means for differentiating operation readiness, in view of the fact that each of those controls is a control in which the readiness of the operation of the actuator can be made different depending upon the operational direction thereof. The explanation of the forms (61)-(63) overlap the explanation made with respect to the above forms, a detailed explanation of which is dispensed with. The above-indicated form (62) is a form to which the limitation according to the technical features of the form (11) is added to the form (61). The above-indicated form (63) is a form to which the limitation according to the technical features of the form

(41) is added to the form (61). It is possible to add, to the form (62), the limitation according to the technical features of any one or ones of the form (12) through (29). It is possible to add, to the form (63), the limitation according to the technical features of any one or ones of the form (42) through (52).

Hereinafter, there will be explained in detail one embodiment of the claimable invention with reference to drawings. It is to be understood that the claimable invention is not limited to the embodiment below, but may be embodied with various changes and improvements based on the knowledge of those skilled in the art, in addition to the forms described in the FORMS OF THE INVENTION.

BRIEF DESCRIPTION OF THE DRAWINGS

FIG. 5 is a table showing change patterns of an electrified phase by the inverter of FIG. 4 in respective operation modes of the electric motor;

FIG. 12 is a schematic view showing a concept of the active-control-unnecessary situation;

FIG. 13 is a table showing characteristics of resistance of the actuator against rotation thereof by the external input force, in an under-active-control-unnecessary-situation control;

BEST MODE FOR CARRYING OUT THE INVENTION

Figure 1:
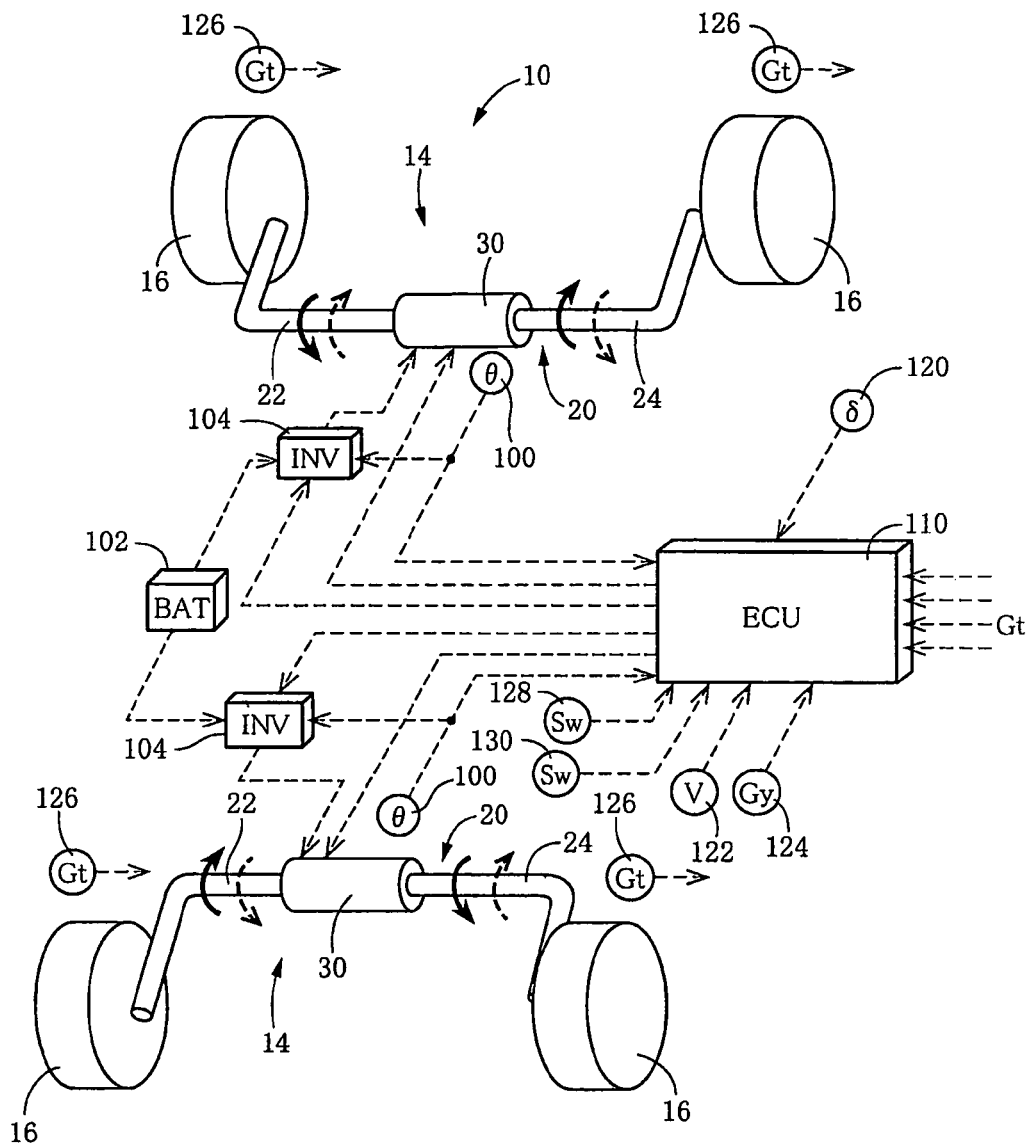
FIG. 1 is a schematic view showing an overall structure of a stabilizer system according to the embodiment of a claimable invention.

There will be described in detail one embodiment of the claimable invention, referring to the drawings. It is to be understood, however, that the invention is not limited to the following embodiment but may be embodied with various changes and modifications, such as those described in the FORMS OF THE INVENTION, which may occur to those skilled in the art.

1. Structure of Stabilizer System

FIG. 1 conceptually shows a stabilizer system 10 for a vehicle according to one embodiment of the claimable invention. The stabilizer system 10 includes two stabilizer apparatuses 14 which are disposed respectively on a front-wheel side and a rear-wheel side of the vehicle. Each stabilizer apparatus 14 includes a stabilizer bar 20 connected at opposite ends thereof to respective wheel holding members (FIG. 2) which respectively hold right and left wheels 16. The stabilizer bar 20 is divided at a middle portion thereof into two parts, i.e., a right stabilizer bar member 22 and a left stabilizer bar member 24. The pair of stabilizer bar members 22, 24 are connected rotatably relative to each other with an actuator 30 interposed therebetween. Roughly speaking, the stabilizer apparatus 14 is arranged such that the actuator 30 rotates the right and left stabilizer bar members 22, 24 relative to each other (as shown in arrows indicated by solid line and arrows indicated by broken line in FIG. 1), thereby changing apparent stiffness of the stabilizer bar 20 as a whole, for controlling or restraining the roll of the vehicle body.

Figure 2:
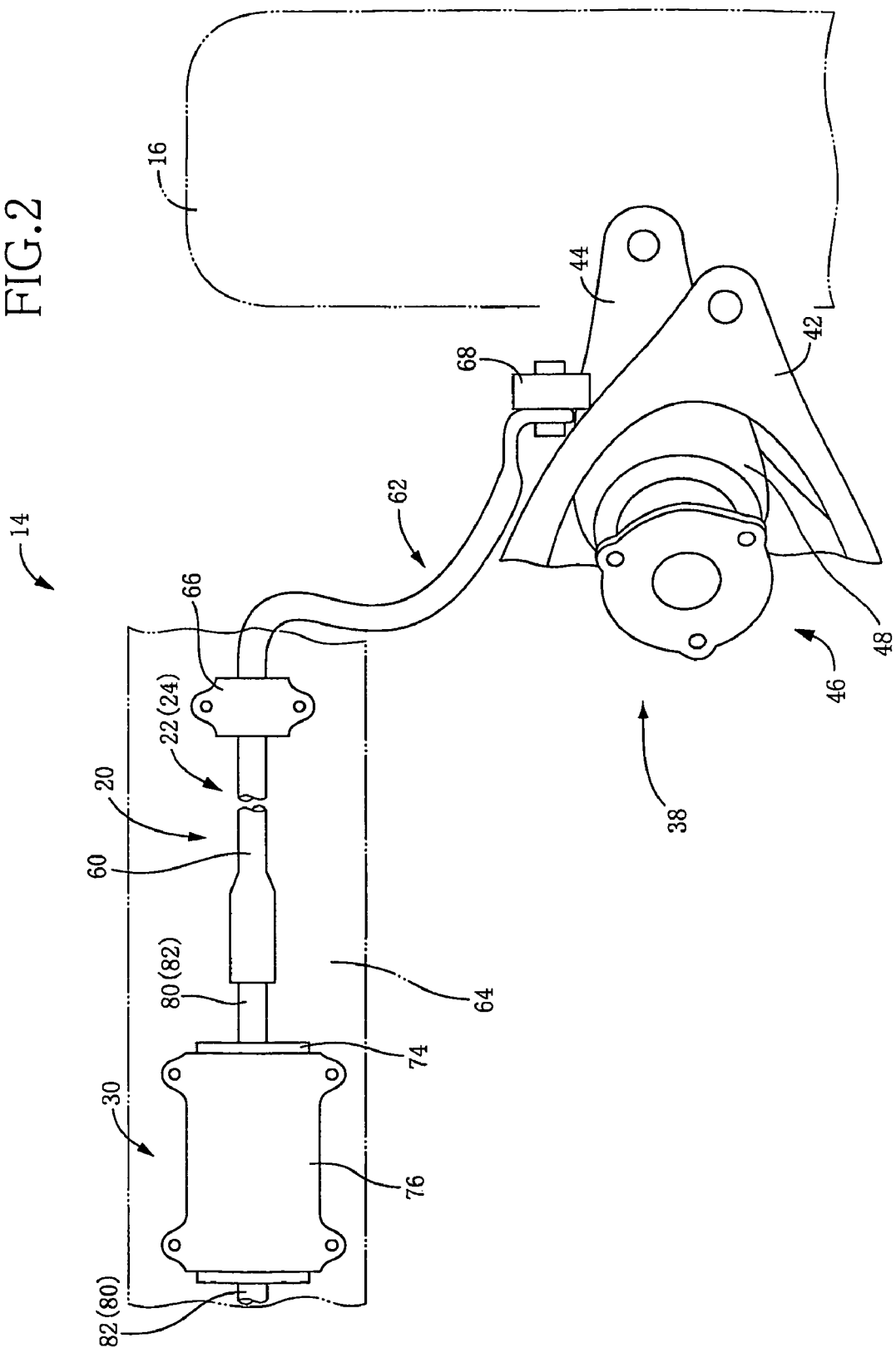
FIG. 2 is a schematic view showing a stabilizer apparatus of the stabilizer system of FIG. 1.

FIG. 2 schematically shows a portion of the stabilizer apparatus 14 ranging from its middle part in a width direction of the vehicle to a wheel 16 on one of the right side and the left side of the vehicle. The vehicle on which the present stabilizer system 10 is installed includes four independent suspension apparatuses 38 provided respectively for the four wheels 16. Each suspension apparatus 38 is a double wishbone type well known in the art and includes an upper arm 42 and a lower arm 44 which cooperate with each other to function as the wheel holding member. Each of the upper and lower arms 42, 44 is rotatably connected at one end thereof to a vehicle body and at the other end thereof to the corresponding wheel 16. Each of the upper and lower arms 42, 44 is pivotably moved or swung about the above-indicated one end (vehicle-body-side end) while the other end (wheel-side end) is moved generally in the vertical direction relative to the vehicle body; as the corresponding wheel 16 and the vehicle body move toward and away from each other (namely, as the wheel 16 and the vehicle body move relative to each other in the vertical direction). The suspension apparatus 38 further includes a shock absorber 46 and a suspension spring 48 (which is an air spring in the present embodiment). Each of the shock absorber 46 and spring 48 is connected at one end thereof to a mount portion on the vehicle-body side and at the other end thereof to the lower arm 44. The thus constructed suspension apparatus 38 elastically supports the corresponding wheel 16 and the vehicle body and has a function of generating damping force with respect to a vibration which is accompanied by the relative displacement between the wheel 16 and the vehicle body toward and away from each other.

The stabilizer apparatus 14 includes the pair of stabilizer bar members as mentioned above, i.e., the right stabilizer bar member 22 and the left stabilizer bar member 24. (In FIG. 2, one of the right and left bar members 22, 24 is shown.) Each of the right and left stabilizer bar members 22, 24 has a torsion bar portion 60 extending substantially in the width direction of the vehicle, and arm portion 62 formed integrally with the torsion bar portion 60 and intersecting the same 60 so as to extend generally in a frontward or a rearward direction of the vehicle. The torsion bar portion 60 of each stabilizer bar member 22, 24 is rotatably supported, at a position thereof near to the arm portion 62, by a support member 66 which is fixedly disposed at a stabilizer-apparatus mounting portion 64 that is a part of the vehicle body. Thus, the torsion bar portions 60 of the respective right and left stabilizer bar members 22, 24 are disposed coaxially relative to each other. Between respective ends of the torsion bar portions 60 of the right and left bar members 22, 24, which ends are located near to a widthwise middle portion of the vehicle, the actuator 30 is disposed. As explained below in detail, the respective ends of the torsion bar portions 60 are connected to the actuator 30. In the meantime, one end of each arm portion 62 remote from the corresponding torsion bar portion 60 is connected to a stabilizer-bar connecting portion 68 of the corresponding lower arm 44 so as to be rotatable relative to the same 68.

Figure 3:
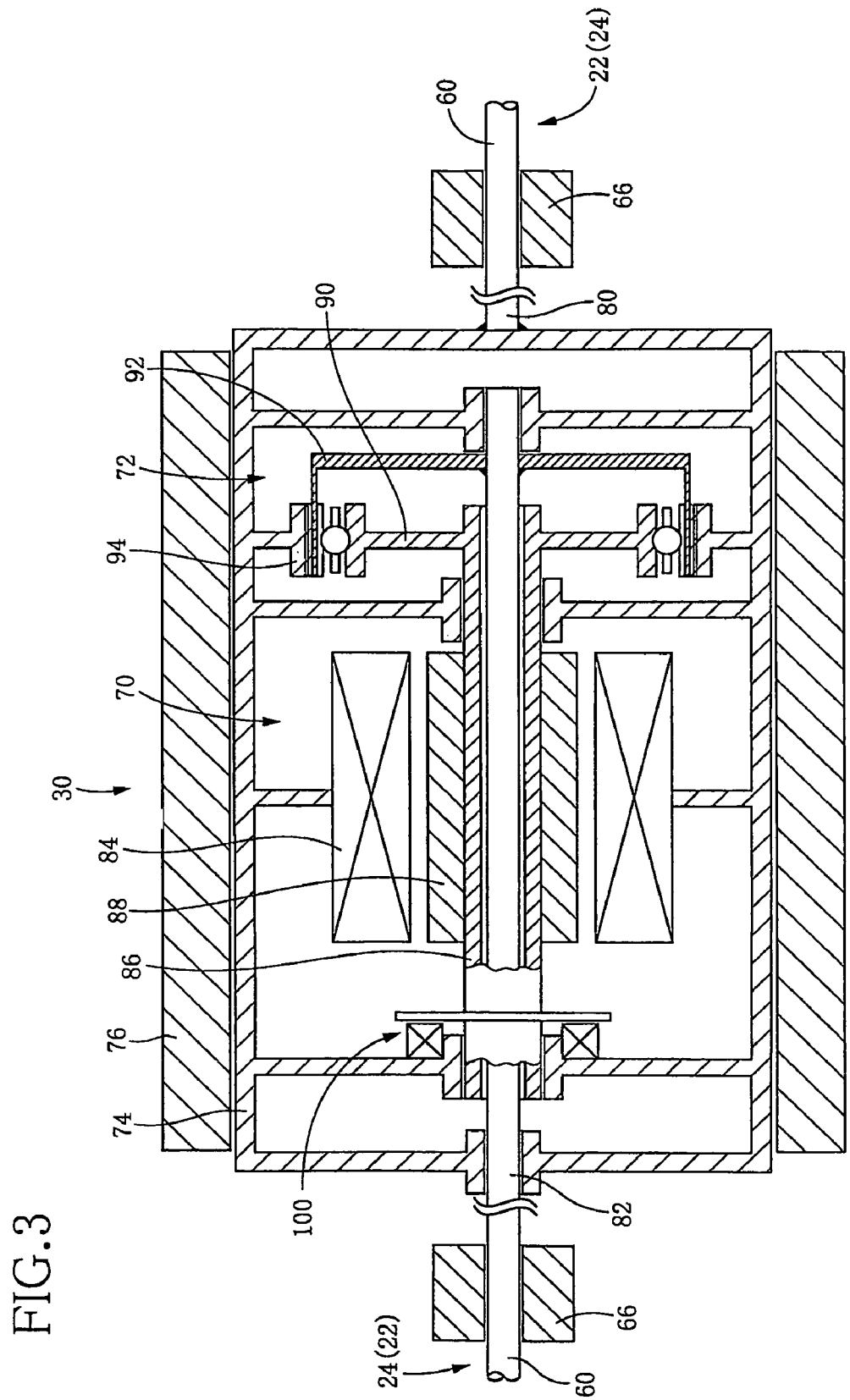
FIG. 3 is a schematic view in cross section showing an actuator of the stabilizer apparatus of FIG. 1.

As schematically shown in FIG. 3, the actuator 30 includes an electric motor 70 and a decelerator 72 connected to the electric motor 70 for decelerating rotation of the electric motor 70. The electric motor 70 and the decelerator 72 are disposed inside a housing 74 as an outer frame member of the actuator 30. The housing 74 is held, at the stabilizer-apparatus mounting portion 64 provided on the vehicle body, by a housing holding member 76 so as to be rotatable and immovable in the axial direction (i.e., substantially in the width direction of the vehicle) relative to the housing holding member 76. As understood from FIG. 2, two output shafts 80, 82 extend respectively from opposite ends of the housing 74. The output shafts 80, 82 are unrotatabley connected by serration engagement, at their leading ends remote from the housing 74 respectively to ends of the respective right and left bar members 22, 24. Further, as shown in FIG. 3, one 80 of the two output shafts 80, 82 is fixedly connected to one of the opposite ends of the housing 74 while the other 82 of the two output shafts 80, 82 is disposed so as to extend into the housing 74 and is held by the housing 74 so as to be rotatable and axially immovable relative to the same 74. One end of the output shaft 82 located within the housing 74 is connected to the decelerator 72 as explained below in detail. The output shaft 82 functions also as an output portion of the decelerator 72.

The electric motor 70 includes: a plurality of coils 84 fixedly disposed on one circumference along an inner circumferential surface of the cylindrical wall of the housing 74; a hollow motor shaft 86 rotatably held by the housing 74; and permanent magnets 88 fixedly disposed on one circumference along an outer circumferential surface of the motor shaft 86 so as to face the coils 84. The electric motor 70 is a motor in which each coil 84 functions as a stator and each permanent magnet 88 functions as a rotor, and is a three-phase DC brushless motor.

In the present embodiment, the decelerator 72 is constituted as a harmonic gear mechanism including a wave generator 90, a flexible gear 92, and a ring gear 94. The wave generator 90 includes an oval cam and ball bearings fitted on a periphery of the cam, and is fixed to one end of the motor shaft 80. The flexible gear 92 is a cup-like member whose cylindrical wall portion is elastically deformable. A plurality of teeth are formed on an outer circumference of the open end portion of the cup-like flexible gear 92. The flexible gear 92 is connected to the output shaft 82 described above and is held by the same 82. In detail, the output shaft 82 penetrates the motor shaft 86 and has an end portion extending from or beyond the one end of the motor shaft 86. To this end portion of the output shaft 82, a bottom portion of the flexible gear 92 is fixed, whereby the flexible gear 92 and the output shaft 82 are connected to each other. The ring gear 94 is a generally ring-like member and is fixed to the housing 74. A plurality of teeth are formed on an inner circumference of the ring gear 94. The number of teeth formed on the inner circumference of the ring gear 94 is slightly larger (e.g., larger by two) than the number of teeth formed on the outer circumference of the flexible gear 92. The flexible gear 92 is fitted at its cylindrical wall portion on the wave generator 90, and is elastically deformed into an oval shape. The flexible gear 92 meshes the ring gear 94 at two portions thereof corresponding to opposite ends of the long axis of the oval and does not mesh the same 94 at other portion thereof. With one rotation of the wave generator 90 (i.e., after rotation of the wave generator 90 by 360°), in other words, after one rotation of the motor shaft 86 of the electric motor 70, the flexible gear 92 and the ring gear 94 are rotated relative to each other by an amount corresponding to the difference in the number of teeth therebetween. Because the structure of the harmonic gear mechanism is known in the art, a detailed illustration of the decelerator 72 is dispensed with and its explanation is limited to brief one given above.

In the thus constructed stabilizer apparatus 14, where the vehicle body undergoes, due to turning of the vehicle, force which changes the distance between one of the right and left wheels 16 and the vehicle body and the distance between the other of the right and left wheels 16 and the vehicle body relative to each other, i.e., the roll moment, the actuator 30 receives force acting thereon which rotates the right stabilizer bar member 22 and the left stabilizer bar member 24 relative to each other, i.e., the external input force. In this instance, when the actuator 30 exerts, as the actuator output force, force which is in balance with the external input force, owing to motor force that is generated by the electric motor 70 (hereinafter may be referred to as rotational torque because the electric motor 70 is a rotation motor and therefore the force generated by the electric motor 70 is considered as rotational torque), one stabilizer bar 20 constituted by the right and left stabilizer bar members 22, 24 is twisted. Elastic force generated by the twisting of the stabilizer bar 20 functions as counter force with respect to the roll moment, i.e., the roll-restraining moment. By changing, owing to the motor force, a relative rotational position of the output shafts 80, 82 of the actuator 30, namely, a rotational position (an operational position) of the actuator 30, a relative rotational position of the right and left stabilizer bar members 22, 24 is changed, whereby the roll amount of the vehicle body can be changed even where the vehicle body undergoes the same roll moment, that is, even where the same roll-moment is generated. The present stabilizer apparatus 14 is arranged such that the apparent stiffness of the stabilizer bar, i.e., the stabilizer stiffness, is changeable.

The actuator 30 is provided, in the housing 74, with a motor-rotational-angle sensor 100 for detecting a rotational angle of the motor shaft 86, i.e., a rotational angle of the electric motor 70. The motor-rotational-angle sensor 100 of the present actuator 30 is constituted principally by an encoder. A value detected by the sensor 100 is utilized in the control of the actuator 30, namely, in the control of the stabilizer apparatus 14, as an index indicating a relative rotational angle (the relative rotational position) of the right and left stabilizer bar members 22, 24, in other words, as an index indicating the operational position (the rotational position) of the actuator 30.

To the electric motor 70 of the actuator 30, electric power is supplied from a battery 102 as a power source device. In the present stabilizer system 10, an inverter 104 is provided between the battery 102 and each stabilizer apparatus 14. Each inverter 104 functions as a drive circuit. Electric power is supplied to the electric motors 70 of the respective two stabilizer apparatuses 14 from the respective inverters 104. Because the electric motor 70 is driven at a constant voltage, the amount of power to be supplied is changed by changing the amount of current to be supplied, and the electric motor 70 exerts or generates force in accordance with the amount of current supplied thereto. In this respect, the amount of current to be supplied is changed such that a ratio (duty ratio) of a pulse-on time to a pulse-off time by PWM (Pulse Width Modulation) is changed by the inverters 104.

As shown in FIG. 1, the present stabilizer system 10 includes a stabilizer electronic control unit (stabilizer ECU) 110 (hereinafter may be simply referred to as "the ECU 110") as a control device for controlling the operation of the stabilizer apparatus 14, in detail, the operation of the actuator 30. The ECU 110 is constituted principally by a computer including a CPU, a ROM, a RAM, etc. To the ECU 110, there are connected, in addition to the aforementioned motor-rotational-angle sensor 100, a steering-angle sensor 120 for detecting an operation angle of a steering wheel which is an operation amount of a steering operating member as a steering amount, a vehicle-speed sensor 122 for detecting a running speed of the vehicle (hereinafter may be simply referred to as "vehicle speed"), a lateral-acceleration sensor 124 for detecting actual lateral acceleration which is lateral acceleration actually generated in the vehicle, and vertical-acceleration sensors 126 each of which is disposed on the mount portion of the vehicle body on which is mounted each suspension apparatus 38 so as to correspond to each wheel 16 and which detects actual vertical acceleration that is vertical acceleration actually generated in each mount portion. In FIG. 1, these sensors 100, 120, 122, 124, 126 are shown as θ, δ, v, Gy and Gt, respectively. To the ECU 110, there are also connected control-mode selecting switch 128 for selecting a control mode of the stabilizer system 10 and a vehicle-characteristic selecting switch 130 for selecting a vehicle characteristic desired by a vehicle operator. The ECU 110 is connected also to each of the inverters 104, whereby the ECU 110 controls the rotational position of each actuator 30 by controlling each inverter 104. In the ROM of the computer of the ECU 110, there are stored a stabilizer control program (which will be explained), various data relating to the control of the stabilizer apparatus 14, and so on.

The present stabilizer system 10 has the two stabilizer apparatuses 14 respectively for the front wheel side and the rear wheel side of the vehicle. The two stabilizer apparatuses 14 are individually controlled in accordance with determined roll stiffness distribution and respectively generate the roll-restraining moment while being individually controlled. In the following description, unless otherwise specified, the two stabilizer apparatuses 14 are construed identical in structure and operation, in the interest of brevity.

2. Operation Mode of Electric Motor

In the present stabilizer system 10, the electric motor 70 of the actuator 30 of each stabilizer apparatus 14 is arranged to be operable in four operation modes and is operated in one of the four operation modes selected on the basis of predetermined conditions and so on. The operation mode of the electric motor 70 depends on a motor-phase-connecting formation and a power-supply status of the electric motor 70. The four operation modes differ from one another in at least one of the motor-phase-connecting formation and the power-supply status.

Figure 4:
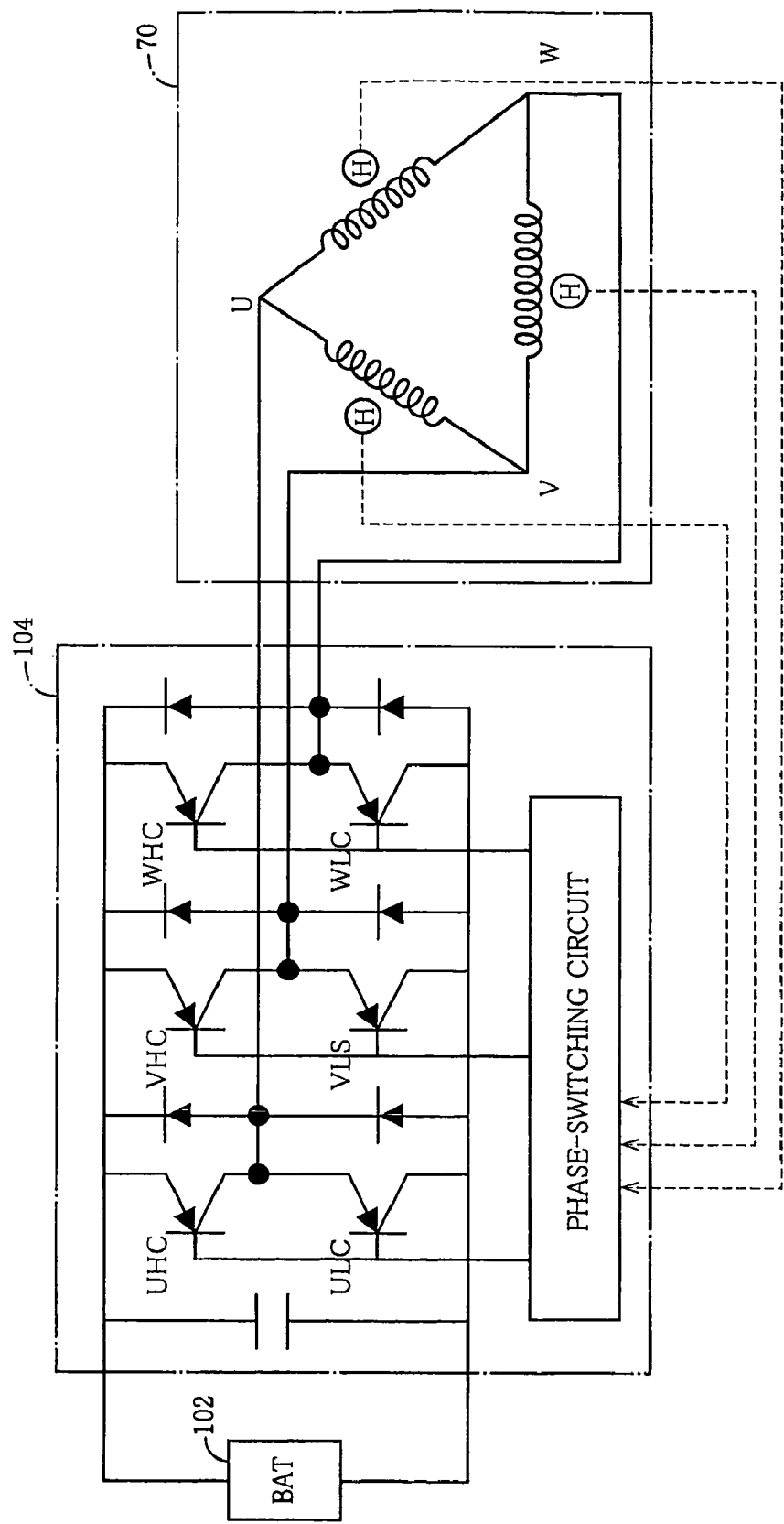
FIG. 4 is a circuit diagram in a state in which inverters of the stabilizer system of FIG. 1 and an electric motor shown in FIG. 3 are connected to each other.

As shown in FIG. 4, the electric motor 70 is a delta-connected, three-phase, DC brushless motor. Each inverter 104 has two switching elements, i.e., a high (plus) side-switching element and a low (minus) side-switching element, for each of the three phases (U, V, W) of the electric motor 70. Hereinafter, the six switching elements of the inverter 104 will be referred to as "UHC", "ULC", "VHC", "VLC", "WHC and "WLC", respectively. A phase-switching-circuit judges a rotational angle (an electric angle) based on signals respectively detected by three Hall elements $H_A$, $H_B$, $H_C$ provided in the electric motor 70 and changes the ON/OFF states of the respective six switching elements corresponding to the rotational angle. The operation mode of the electric motor 70 is changed by changing the pattern of the ON-OFF states of the switching elements of the inverter 104.

The operation mode is classified broadly into two modes: (1) a power-supplying control mode in which the amount of electric power to be supplied to the electric motor 70 is controlled while changing phases of the electric motor in supplying electric power to the motor, for actively controlling the actuator 30; and (2) a no-power-supply mode in which no power is supplied from the battery 102 to the electric motor 70. The no-power-supply mode is an operation mode in which the actuator 30 is not actively controlled. In the present embodiment, there may be employed, as the no-power-supply mode, a stand-by mode, a braking mode and a free mode. Each of the operation modes will be explained hereinafter.

(A) Power-Supplying Control Mode

The power-supplying control mode is an operation mode wherein the motor-phase-connecting formation is a formation in which the operation of the electric motor 70 is controllable and wherein electric power is supplied to the electric motor 70. In the power-supplying control mode, according to a system called 120° rectangular-wave drive system, the ON/OFF states of the respective switching elements UHC, ULC, VHC, VLC, WHC, WLC are changed depending upon the rotational angle of the electric motor 70. Described more specifically, the phase of the electric motor 70 to be electrified (the electrified phase) is changed for every 60° of an electric angle. Since the electric motor 70 in the present embodiment is a three-phase and six-pole motor, the electrified phase is sequentially changed for every 20° of the motor rotational angle corresponding to 60° of the electric angle. As shown in FIG. 5, in the power-supplying control mode, a change pattern of the electrified phase of the electric motor 70 differs depending upon a direction of generation of the motor force, i.e., a torque generating direction which is a direction of generation of the rotational torque. By selecting suitable one of the changing patterns, the torque generating direction of the electric motor 70 is determined. In this respect, in the following explanation, the torque generating direction is expediently referred to as a clockwise (CW) direction and a counterclockwise (CCW) direction. In the power-supplying control mode, only the switching elements ULC, VLC, WLC on the low side are subjected to an ON/OFF control according to a duty ratio, namely, a duty control. By changing the duty ratio, the amount of electric current to be supplied to the electric motor 70 is changed. Each symbol "1*" in FIG. 5 indicates a state in which those switching elements are under the duty control.

As explained above, in the power-supplying control mode, the torque generating direction of the electric motor 70 and the amount of electric power supplied to the electric motor 70 can be controllable. Accordingly, in the power-supplying control mode, it is possible to generate, in an arbitrary direction, rotational torque whose magnitude corresponds to the amount of electric current supplied to the electric motor 70. Because the direction and the magnitude of the actuator output force can be controllable, it is possible to generate roll-restraining moment corresponding to roll moment, permitting active control of the stabilizer apparatus 14.

(B) Stand-by Mode

The stand-by mode is one type of the no-power supply mode and more particularly one type of a phase-change-executing no-power supply mode. In this operation mode, no power is supplied from the power source though the phase of the electric motor 70 to be electrified (the electrified phase) is changed in response to the command of the torque generating direction. Explained more specifically referring to FIG. 5, as in the power-supplying control mode, the ON/OFF states of the respective switching elements UHC, ULC, VHC, VLC, WHC, WLC are changed in accordance with the rotational angle of the electric motor 70. The stand-by mode differs from the power-supplying control mode in that the duty control is not executed in any of the switching elements UHC, VHC, WHC on the high side and the switching elements ULC, VLC, WLC on the low side. It may be said that the duty control is performed such that the duty ratio is zero. In other words, there exist no pulse-on times, and no electric power is actually supplied to the electric motor 70. Each symbol "0*" in FIG. 5 shows this state.

Figure 6:
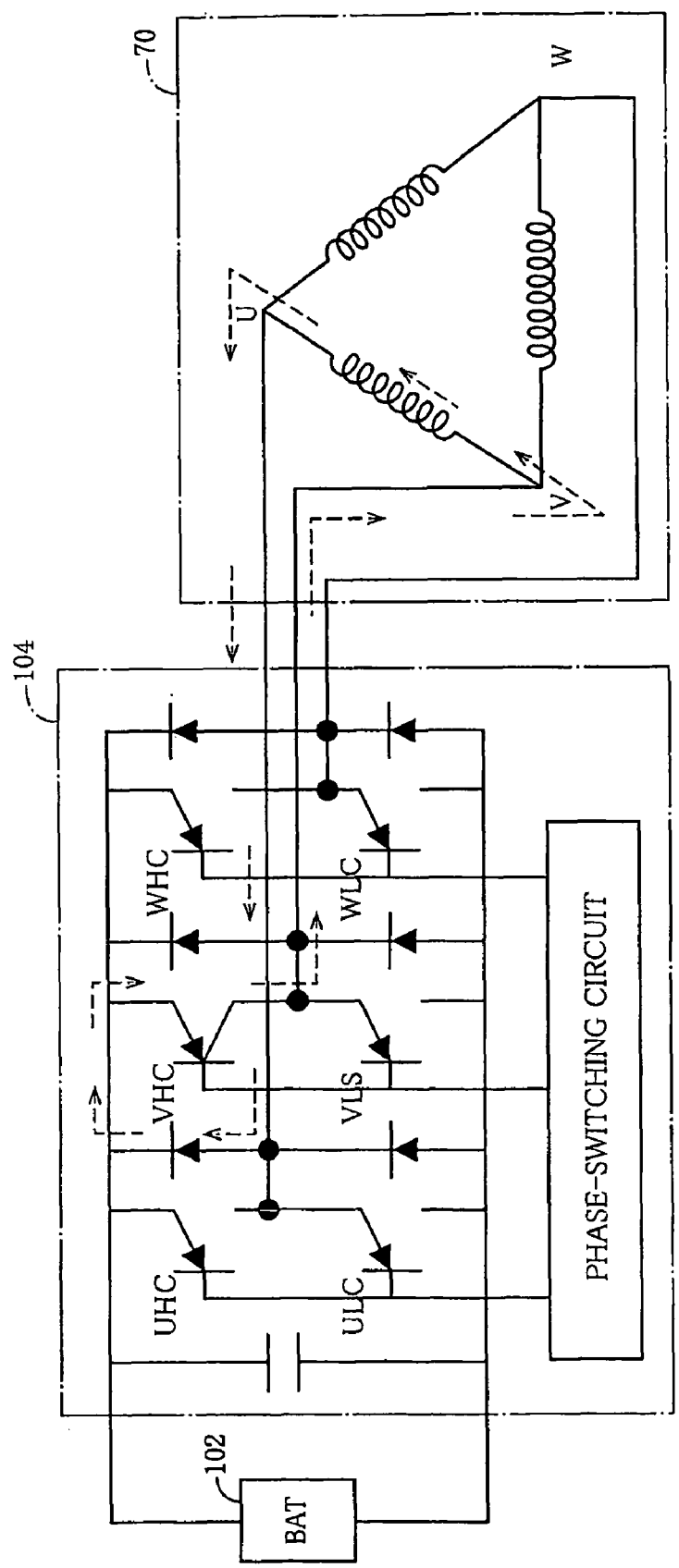
FIG. 6 is a view schematically showing a state in which electromotive force is generated in the circuit diagram of FIG. 4.
Figure 7:
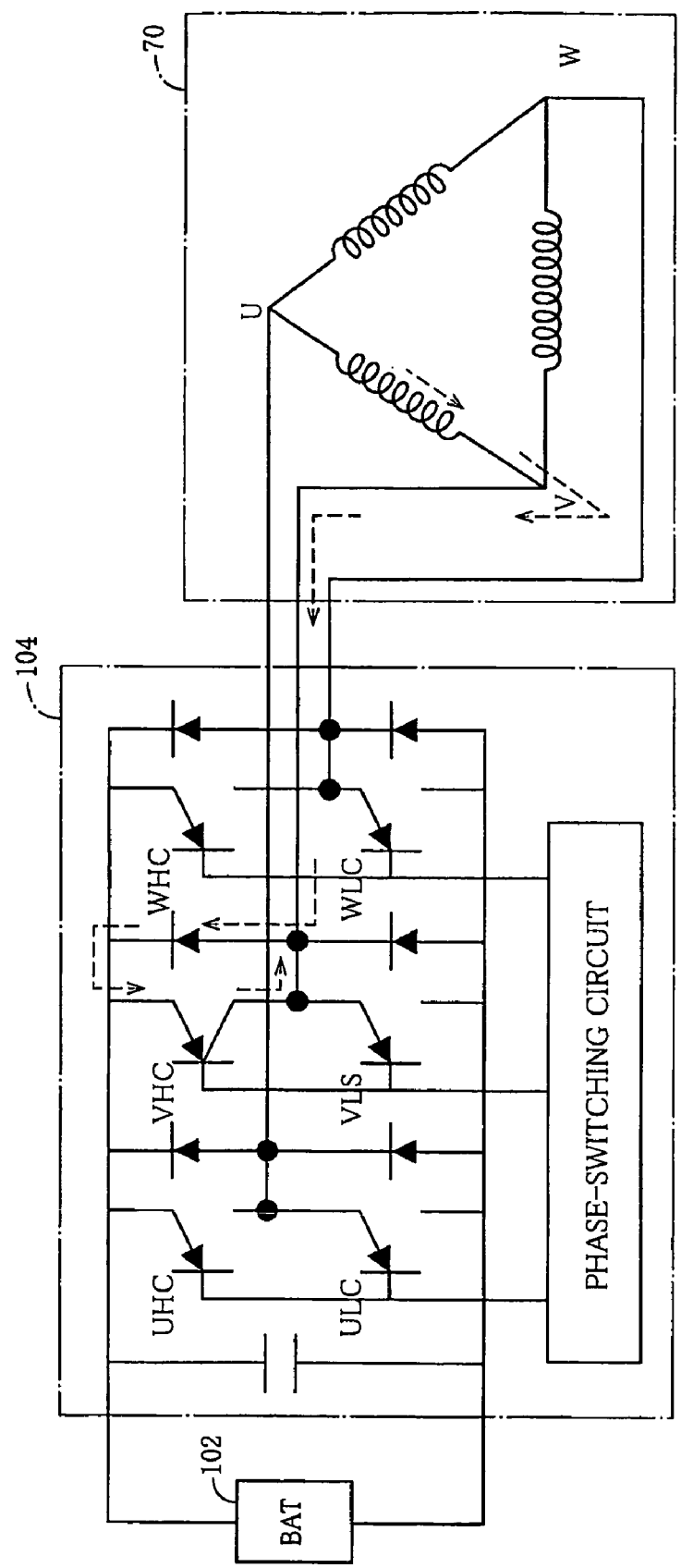
FIG. 7 is a view schematically showing a state in which electromotive force is not generated in the circuit diagram of FIG. 4.

In the stand-by mode, since no electric power is supplied to the electric motor 70, the operation of the electric motor 70 is not completely controllable. However, the changing of the electrified phase is executed as described above, so that this stand-by mode deals with transition to the power-supplying control mode with readiness. Therefore, the stand-by mode does not suffer from control delay and is excellent in responsiveness or readiness. Further, in this stand-by mode, the braking effect of the electric motor 70 can be made different by the torque generating direction determined by changing the electrified phase based on the command (actually, no rotational torque is generated based on electric power because no electric power is supplied from the battery 102) and a direction corresponding to the rotational direction (the operational direction) of the actuator, namely, the actual rotational direction of the electric motor 70. In short, depending upon whether or not the change pattern of the electrified phase and the rotational direction of the electric motor 70 coincide with each other, it is possible to change the magnitude of the resistance with respect to the rotation of the motor 70 when the motor 70 is rotated by the external input force applied to actuator 30. More concretely explained, where the torque generating direction and the rotational direction of the electric motor 70 are opposite to each other, the switching elements are placed under the ON/OFF states shown in FIG. 6. As can be seen from FIG. 6, when the electric motor 70 is rotated by the external input force, there is formed a route of electric current passing through reflux diodes, whereby an electric current arising from electromotive force flows. In this instance, the electric motor 70 exhibits braking effect, and the actuator generates resistance against the rotation of the actuator 30 by the external input force. On the contrary, where the torque generating direction and the rotational direction of the electric motor 70 are the same, the switching elements are placed under the ON/OFF states shown in FIG. 7. As can been seen from FIG. 7, even when the electric motor 70 is rotated by the external input force, no current route is formed and no electric current arising from electromotive force flows. In this instance, therefore, the electric motor 70 exhibits no braking effect, and the actuator 30 exhibits no resistance against the rotation of the actuator 30 by the external input force. Thus, in the stand-by mode, the characteristic of the actuator 30 and accordingly the characteristic of the stabilizer apparatus 14 can be changed depending upon the torque generating direction determined by the command and the rotational direction of the electric motor 70, in spite of the fact that no electric power is supplied from the battery 102 to the electric motor 70.

(C) Braking Mode

The braking mode is one type of the no-power supply mode and more particularly one type of a phase-interconnection mode. In this braking mode, the motor-phase-connecting formation is a formation in which the phases of the electric motor 70 are connected to each other (in which terminals of the motor 70 are connected to each other). Namely, all of the switching elements that are disposed on one of the high side and the low side are kept in ON (closed) states while all of the switching elements that are disposed on the other of the high side and the low side are kept in OFF (open) states. More specifically explained, in the present embodiment, all of the switching elements UHC, VHC, WHC on the high side are placed in ON (closed) states while all of the switching elements ULC, VLC, WLC on the low side are placed in OFF (open) states, as shown in FIG. 5. Owing to these switching elements UHC, VHC, WHC placed in the ON states and the reflux diodes disposed together with those switching elements, the phases of the electric motor 70 are kept as if they were short-circuited to each other. In such a state, there is given a so-called short-circuiting breaking effect to the electric motor 70. Accordingly, when the actuator 30 is compelled to be operated at a high speed by the external input force, the actuator 30 exhibits relatively large resistance against the operation thereof, so that the stabilizer apparatus 14 is placed into a state close to a conventional stabilizer apparatus in which the stabilizer stiffness is not changeable.

(D) Free Mode

The free mode is one type of the no-power supply mode and more particularly one type of an all-phase interception mode. In the free mode, the motor-phase-connecting formation is a formation in which electric power is inhibited from being supplied to the phases of the electric motor 70 (in which each terminal of the motor 70 is free). More specifically explained, all of the switching elements UHC, ULC, VHC, VLC, WHC, WLC are placed in OFF (open) states, as shown in FIG. 5, whereby the phases of the electric motor 70 are kept in a state close to that in which the phases of the electric motor 70 and the corresponding inverter 104 are disconnected from each other. Accordingly, in the free mode, no electric current arising from electromotive force flows in the electric motor 70, and there is obtained substantially no braking effect by the electric motor 70. Therefore, where the free mode is employed, the stabilizer bar is placed in a state in which the stabilizer bar exhibits substantially no stiffness, and the vehicle is placed in a state close to that in which the vehicle is not equipped with the stabilizer.

3. Positive Efficiency and Negative Efficiency of Actuator

Owing to the structure of the stabilizer system as explained above, the present stabilizer apparatus 14 is capable of generating the roll-restraining moment which counters the roll moment that acts on the vehicle body upon turning of the vehicle and so on. Further, the stiffness of the stabilizer bar 20 is changed by the operation of the actuator 30, rendering it possible to control the roll amount of the vehicle body. When the roll moment is acting on the vehicle body, the actuator 30 undergoes the force that compels the actuator 30 to be operated due to the roll moment, namely, the external input force. Accordingly, for permitting the stabilizer apparatus 14 to generate desired roll-restraining moment, it is necessary that the rotational position of the actuator 30 is not changed even by the external input force acting thereon. Namely, it is required that the electric motor 70 exhibit the rotational torque that is large enough to inhibit the actuator 30 from being rotated by the external input force. Moreover, for positively restraining the roll amount of the vehicle body, it is required that the electric motor 70 generate the rotational torque which enables the actuator 30 to be rotated against the external input force while at the same time inhibiting the rotation of the actuator 30.

Here, a ratio of output force (e.g., the rotational torque) of the electric motor 70 required for inhibiting the actuator 30 from being rotated by the external input force, to the external input force, is defined as negative efficiency $\eta_N$. A ratio of the external input force to output force of the electric motor 70 required for rotating the actuator 30 against the external input force is defined as positive efficiency $\eta_P$. The positive efficiency $\eta_P$ and the negative efficiency $\eta_N$ of the present actuator 30 are expressed by the following formulas and indicated in FIG. 8:

positive efficiency $\eta_P = Is/Tq$ negative efficiency $\eta_N = Tq/Is$

Figure 8:
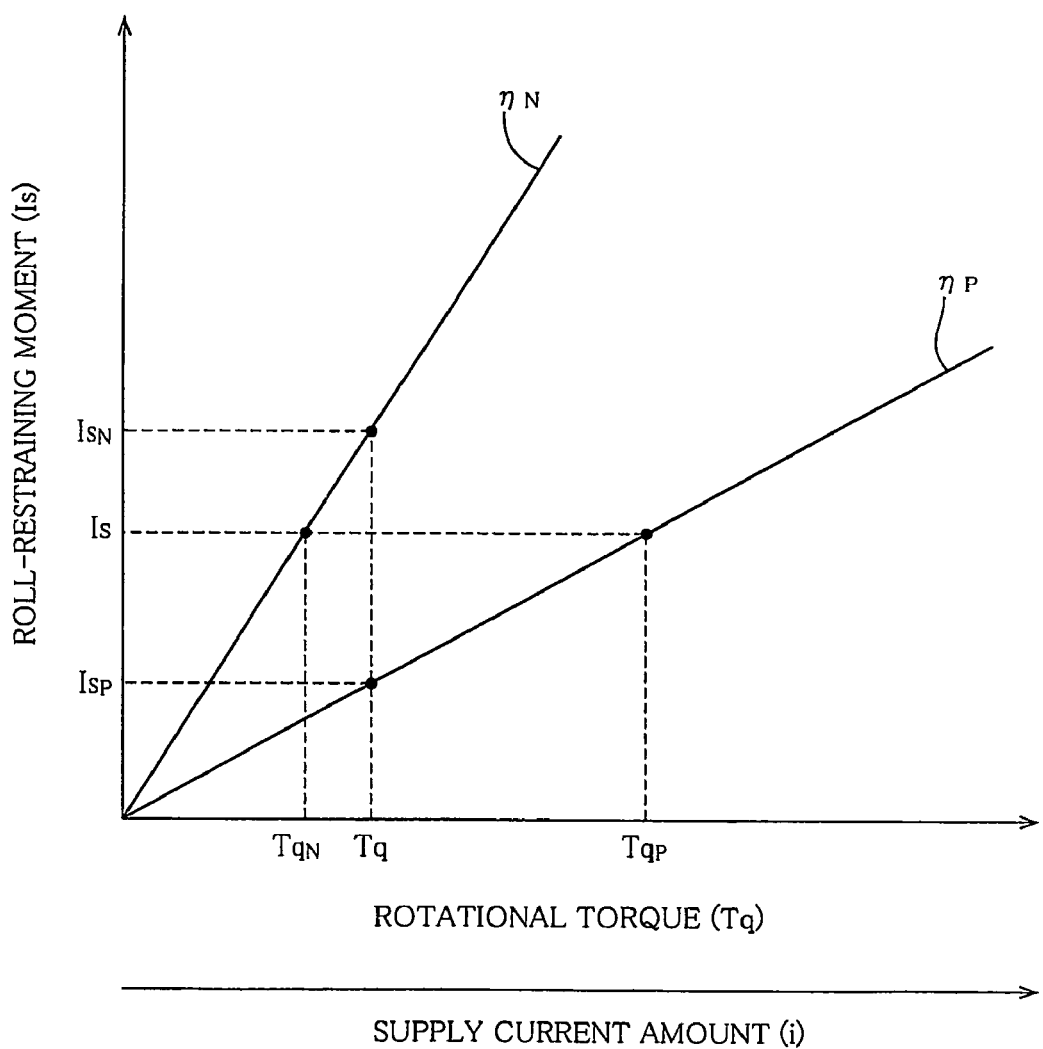
FIG. 8 is a graph schematically showing positive efficiency and negative efficiency of the actuator.

In FIG. 8, the rotational torque Tq (which may be considered to be proportional to an amount i of the electric current supplied to the electric motor 70) is employed as the output force of the electric motor 70 while the roll-restraining moment Is generated by the stabilizer apparatus 14 is employed as the external input force. The roll-restraining moment Is may be construed as a portion of the roll moment the vehicle receives, which portion is borne by the stabilizer apparatus 14, in the light of relationship between action and reaction. The rotational torque Tq and the roll-restraining moment Is are expressed in a homogeneous dimension. The gradient of the line indicating the positive efficiency $\eta_P$ in FIG. 8 (hereinafter may be referred to as "positive-efficiency characteristic line") represents values of the positive efficiency $\eta_P$ while the gradient of the line indicating the negative efficiency $\eta_N$ in FIG. 8 (hereinafter may be referred to as "negative-efficiency characteristic line") represents values of the negative efficiency $\eta_N$.

As can be seen from FIG. 8, even in a case where the same magnitude of the roll-restraining moment Is is generated, the value of the rotational torque $Tq_P$ of the electric motor 70 required under the positive-efficiency characteristic differs from the value of the rotational torque $Tq_N$ of the electric motor 70 required under the negative-efficiency characteristic (i.e., $Tq_P > Tq_N$). Further, even in a case where the electric motor 70 generates the same magnitude of the rotational torque Tq, the roll-restraining moment $I_{SP}$ that can be generated under the positive-efficiency characteristic differs from the roll-restraining moment $I_{SN}$ that can be generated under the negative-efficiency characteristic (i.e., $I_{SN} > I_{SP}$). More specifically explained by defining, as $i_q$, the electric current to the electric motor 70 that corresponds to the rotational torque Tq of the same 70, the actuator 30 is not rotated by roll moment which is in balance with the roll-restraining moment $I_{SN}$ conforming to the negative efficiency $\eta_N$ while, on the other hand, the actuator 30 is rotated only against roll moment smaller than roll moment which is in balance with the roll-restraining moment $I_{SP}$ conforming to the positive efficiency $\eta_P$, where the electric current amount $i_q$ is supplied to the motor 70. Therefore, in the control of the stabilizer apparatus 14, in particular, in the active control which will be explained, the amount of the electric current to be supplied to the motor 70 is determined by taking account of the positive-efficiency characteristic and the negative-efficiency characteristic.

4. Various Control Forms of Stabilizer Apparatus

In the present stabilizer system 10, under the aforementioned power-supplying control mode, i.e., under the mode in which the torque generating direction of the electric motor 70 and the electric current amount to be supplied to the motor 70 are controllable, the roll-restraining moment is generated and the stabilizer stiffness is changed, whereby the roll-restraining effect of the vehicle body can be actively controlled according to the roll moment that the vehicle body receives, for example. (Hereinafter, such control may be referred to as "active control".) It is supposed that there exist situations in which it is not necessary to execute the active control, it is not desirable to execute the active control, and so on. In the present stabilizer system 10, such situations are identified or recognized as specific situations. Under the specific situations, the present stabilizer system 10 is arranged to execute special control which differs from the active control. (Hereinafter, such control may be referred to as "under-specific-situation control"). Hereinafter, the active control and the under-specific-situation control will be explained in detail.

(A) Active Control

In the active control, a target rotational position of the actuator 30 is determined based on a roll-moment index amount which is indicative of roll moment that the vehicle body receives, and the rotational position of the actuator 30 is controlled so as to coincide with the determined target rotational position. Namely, on the basis of the roll-moment index amount, the torque generating direction of the electric motor 70 and the amount of the electric current to be supplied to the motor 70 are determined. The electric motor 70 is operated in accordance with the determined torque generating direction and the electric current supply amount, whereby the direction and the magnitude of the actuator output force are controlled to generate the roll-restraining moment corresponding to the roll moment, resulting in execution of the active control of the stabilizer apparatus 14. Here, the rotational position of the actuator 30 means the following: A status in which no roll moment acts on the vehicle body is deemed as a normal state. Where the rotational position of the actuator 30 in the normal state is deemed as a neutral position, the rotational position of the actuator 30 indicates an amount of rotation from the neutral position. That is, the rotational position of the actuator 30 means a displacement amount of the operational position of the actuator from the neutral position. Because there is correspondence relationship between the rotational position of the actuator 30 and the motor rotational angle which is a rotational angle of the electric motor 70, the motor rotational angle is actually used in the active control, in place of the rotational position of the actuator 30.

The active control will be explained in more detail. In the present embodiment, in an attempt to obtain appropriate stabilizer stiffness, the target rotational position of the actuator 30, i.e., a target motor rotational angle θ* is determined on the basis of lateral acceleration as the above-indicated roll-moment index amount. More specifically described, control-use lateral acceleration Gy* to be utilized in the control is determined according to the following formula on the basis of estimated lateral acceleration Gyc that is estimated based on the operation angle of the steering wheel and the vehicle running speed; and actual lateral acceleration Gyr that is actually measured:

$$Gy^* = K_1 \cdot Gyc + K_2 \cdot Gyr$$

wherein $K_1$ and $K_2$ are gains. The target motor rotational angle $\theta^*$ is determined based on the thus determined control-use lateral acceleration $Gy^*$. An actual motor rotational angle $\theta$ is fed back, whereby a target supply current $i^*$ to be supplied to the motor 70 is determined according to a feed-back control method based on the motor rotational angle. In detail, initially, motor-rotational-angle deviation $\Delta\theta$ ($=\theta^*-\theta$) is obtained which is deviation of the actual motor rotational angle $\theta$ with respect to the determined target motor rotational angle $\theta^*$. Then, the target supply current $i^*$ to be supplied to the motor 70 is determined according to the following formula using the motor-rotational-angle deviation $\Delta\theta$ as a parameter:

$$i^* = Ka \cdot \Delta\theta + Kb \cdot Int(\Delta\theta)$$

The formula indicated just above conforms to a PI control rule. In the formula, the first term and the second term respectively represent a proportional-term and an integral term, and Ka and Kb respectively represent a proportional gain and an integral gain. Further, "$Int(\Delta\theta)$" in the formula corresponds to an integral value of the motor-rotational-angle deviation $\Delta\theta$ and is closely related to the target motor rotational angle $\theta^*$ (may be considered to be closely related to the actual motor rotational angle $\theta$). Therefore, the above-indicated formula may be deemed equivalent to the following formula:

$$i^* = Ka \cdot \Delta\theta + Kb \cdot \theta^*$$

Because the target supply current $i^*$ has different directions of power supply depending upon its sign (+, −), for instance, it may be considered that the target supply current $i^*$ indicates also the torque generating direction of the electric motor 70. Accordingly, the determination of the target supply current $i^*$ results in determination of the torque generating direction which is a command value to the electric motor 70. On the basis of the determined target supply current $i^*$, the duty ratio as the command value to the electric motor 70 is determined. The electric motor 70 is operated in accordance with the torque generating direction and the duty ratio, whereby the active control is executed. In the exemplary embodiment, while the active control is executed under the positional control (the rotational-angle control) in which the rotational position of the actuator 30 is a direct subject to be controlled, the active control may be executed under an output force control (a torque control) in which the direction and the magnitude of the actuator output force are direct subjects to be controlled.

In the above-indicated formula conforming to the PI control rule, the proportional term as the first term is represented as a proportional-term electric-current component "$i_h$" and the integral term as the second term is represented as an integral-term electric-current component "$i_s$". Those components $i_h$ and $i_s$ are represented by the following formulas, respectively:

$$i_h = Ka \cdot \Delta\theta$$

$$i_s = Kb \cdot \theta^*$$

According to the formulas, because the electric motor 70 is under the constant-voltage control, the integral-term electric-current component $i_s$ may be considered to be a displacement-amount-dependent supply-power component which depends upon the displacement amount of the actuator 30 from its neutral position. Further, as mentioned above, the integral-term electric-current component $i_s$ may be considered as a power component to be supplied to the electric motor 70 for permitting the motor 70 to exhibit steady or fundamental motor force required for maintaining the rotational position of the actuator 30, i.e., operational-position-maintaining power. In this respect, since the integral-term electric-current component $i_s$ is output force of the motor 70 required for inhibiting the actuator 30 from being rotated even by the external input force, the integral-term electric-current component is has a magnitude complying with the negative efficiency of the actuator 30. In the meantime, since the motor-rotational-angle deviation $\Delta\theta$ as the parameter of the proportional-term electric-current component $i_h$ is deviation of the rotational position with respect to the target rotational position of the actuator 30, i.e., operational-position deviation, the proportional-term electric-current component $i_h$ may be deemed as deviation-dependent supply-power component. Further, as mentioned above, the proportional-term electric-current component $i_h$ is power for correcting the above-indicated steady or fundamental motor force so as to increase or decrease, based on the relationship between the target rotational position and the current rotational position of the actuator. Accordingly, the proportional-term electric-current component $i_h$ may be deemed as corrective power. The target supply current $i^*$ may be deemed as a sum of the displacement-amount-depending supply-power component and the deviation-dependent supply-power component, i.e., supply-power-component sum.

In the present embodiment, while the target supply current $i^*$ is determined according to the PI control rule, the target supply current $i^*$ may be determined according to a PDI control rule. In this case, the following formula is a formula complying with the PDI control rule. In the following formula, there is added, to the formula complying with the PI control rule, a differential term (D term), i.e., a term using a differential value of the motor-rotational-angle deviation $\Delta\theta$ as a parameter.

$$i^* = Ka \cdot \Delta\theta + Kb \cdot Int(\Delta\theta) + Kc \cdot \Delta\theta'$$

wherein Kc is a differential gain. In the determination of the target supply current $i^*$, according to the PDI control rule, a sum of the proportional-term (P term) and the differential term (D term) corresponds to the deviation-dependent supply-power component while the integral term (I term) corresponds to the displacement-amount-dependent supply-power component.

Figure 9:
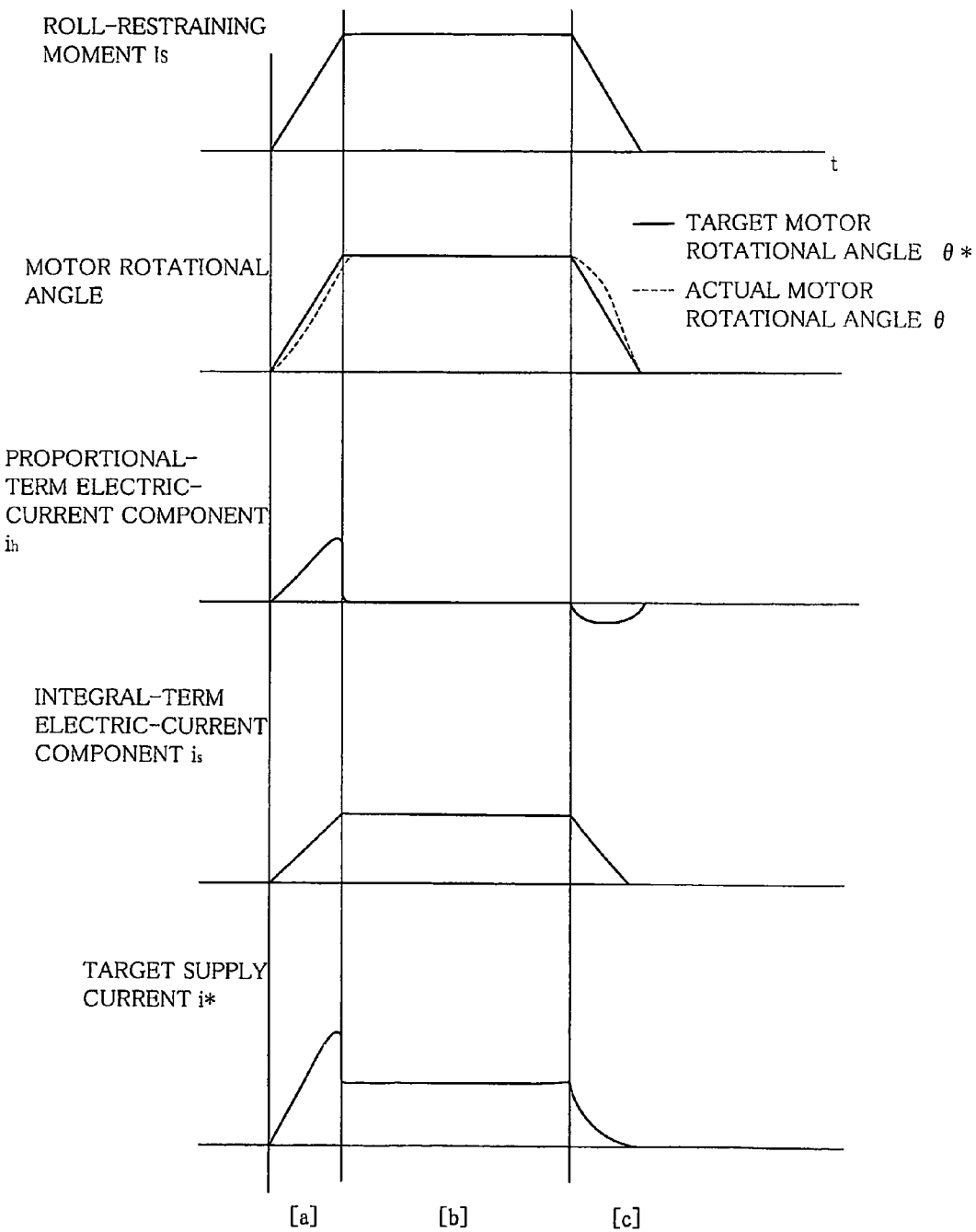
FIG. 9 is a chart schematically showing changes in roll-restraining moment, target motor rotational angle, actual motor rotational angle, proportional-term electric-current component, integral-term electric-current component and target supply current, with respect to lapse of time, in one turning motion of the vehicle.

FIG. 9 shows a relationship, in the active control, among roll-restraining moment Is to be required, target motor rotational angle $\theta^*$, actual motor rotational angle $\theta$, proportional-term electric-current component $i_h$, integral-term electric-current component $i_s$ and target supply current $i^*$, in one turning motion of the vehicle in which the running speed is kept constant. In the graph, the abscissa axis represents a lapse of time. In one turning motion of the vehicle, the roll-restraining moment changes as follows, according to the roll moment acting on the vehicle body. In an initial period [a] of the turning, the roll-restraining moment Is increases with an increase in the operation angle of the steering wheel. In a subsequent middle period [b] of the turning, the operation angle of the steering wheel is kept constant (i.e., steady turning) and the roll-restraining moment is made constant. Thereafter, in a final period [c] of the turning, the roll-restraining moment Is decreases with a decrease in the operation angle of the steering wheel. The target motor rotational angle $\theta^*$ correspondingly changes, and the actual motor rotational angle $\theta$ correspondingly changes as shown in FIG. 9 while suffering from some delay with respect to the target motor rotational angle $\theta^*$.

The target supply current i* to the electric motor 70 is determined on the basis of the target motor rotational angle θ* and the actual motor rotational angle θ as explained above. Therefore, the target supply current i* changes with changes in the roll-restraining moment Is, the target motor rotational angle θ* and the actual motor rotational angle θ. In detail, the target supply current i* is a sum of the proportional-term electric-current component $i_h$ and the integral-term electric-current component $i_s$, and changes with changes in those components $i_h$, $i_s$. The two components $i_h$, $i_s$ will be explained individually. As the integral-term electric-current component $i_s$ functions as the operational-position-maintaining power, the integral-term electric-current component $i_s$ changes depending upon the target motor rotational angle θ*, as shown in FIG. 9. Namely, the integral-term electric-current component $i_s$ increases at the initial period [a] of the turning, is kept constant at the middle period [b] of the turning and decreases at the final period [c] of the turning. In contrast, the proportional-term electric-current $i_h$ functions as the corrective power. Accordingly, the proportional-term electric-current $i_h$ becomes, at the initial period [a] of the turning, a value having the same direction as the integral-term electric-current component $i_s$, i.e., a value having the same torque generating direction as that based on the integral-term electric-current component $i_s$. At the middle period [b] of the turning, the proportional-term electric-current $i_s$ is generally zero. Further, at the final period [c] of the turning, the proportional-term electric-current component $i_h$ becomes a value having a sign (+, −) opposite to the integral-term electric-current component $i_s$, i.e., a value having a torque generating direction opposite to that of the integral-term electric-current component $i_s$. The integral-term electric-current component $i_s$ is made equal to a value complying with the negative efficiency of the actuator 30. Because the rotational position of the actuator 30 needs to be changed against the external input force at the initial period [a] of the turning, a proportional gain Ka is set for permitting the target supply current i* to be made equal to a value complying with the positive efficiency of the actuator 30 at the initial period [a].

(B) Under-Specific-Situation Control

The under-specific-situation control in the present embodiment is constituted by including two controls having mutually different control forms. One of the two controls is an under-supply-power-component-direction-different-situation control. The situation in which the torque generating direction based on the proportional-term electric-current component $i_h$ and the torque generating direction based on the integral-term electric-current component $i_s$ are different from each other, i.e., a supply-power-component-direction different situation, is identified as the specific situation. Based on the identification, the under-supply-power-component-direction-different-situation control is executed. The other of the two controls is an under-active-control-unnecessary-situation control. The situation in which the vehicle is running straightforward is regarded as an active-control-unnecessary situation, and the situation is identified as the specific situation. Based on the identification, the under-active-control-unnecessary-situation control is executed. As explained below, one of the two controls are selectively executed in response to the control mode of the present stabilizer system 10 that is selected on the basis of manipulation of the control-mode selecting switch 128 by a vehicle operator. Hereinafter, the two under-specific-situation control will be explained in order.

(i) Under-Supply-Power-Component-Direction-Different-Situation Control

Figure 10:
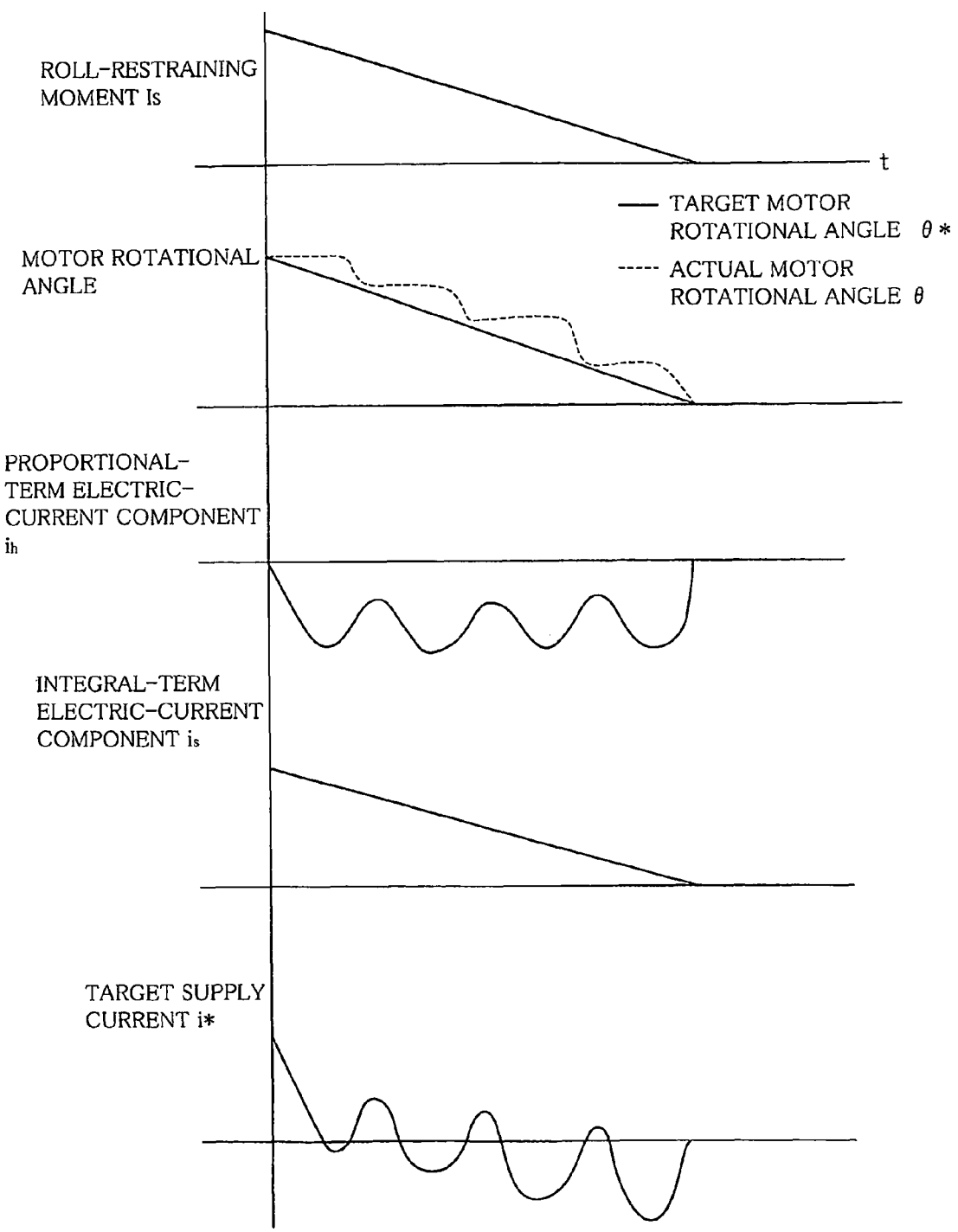
FIG. 10 is a chart schematically showing changes in roll-restraining moment, target motor rotational angle, actual motor rotational angle, proportional-term electric-current component, integral-term electric-current component and target supply current, with respect to lapse of time, when the vehicle receives disturbance external input force at a final period of the turning.

As mentioned above, the under-supply-power-component-direction-different-situation control is executed in the situation in which a torque generating direction based on the proportional-term electric-current component $i_h$ and a torque generating direction based on the integral-term electric-current component $i_s$ differ from each other. As mentioned above, since such a situation occurs at the final period [c] of the turning, the following description will be made with respect to the final period [c] by way of example. At the final period [c] of the turning, the torque generating direction based on the proportional-term electric-current component $i_h$ as the deviation-dependent supply-power component (hereinafter may be referred to as "deviation-dependent direction") coincides with a direction which permits the rotational position of the actuator 30 to come closer to the neutral position (hereinafter may be referred to as "neutral direction"). On the contrary, the torque generating direction based on the integral-term electric-current component $i_s$ as the displacement-amount-dependent supply-power component (hereinafter may be referred to as "displacement-amount-dependent direction") coincides with a direction which permits the rotational position of the actuator to separate or move away from the neutral position (hereinafter may be referred to as "counter-neutral direction"). The above-indicated one turning motion of the vehicle shown in FIG. 9 suffers from no disturbance external input force due to irregularities or bumpiness of the road surface. In this case, even when the deviation-dependent direction and the displacement-amount-dependent direction are mutually different, the target supply current i* as the sum of the proportional-term electric-current component $i_h$ and the integral-term electric-current component $i_s$ is supplied to the electric motor 70 in a good state, and the actuator 30 is finely controlled. In the actual running of the vehicle, however, the vehicle inevitably suffers from the disturbance external input force due to the irregularities or bumpiness of the road surface, for instance. In such a case wherein the external input force occurs, the relationship among the roll-restraining moment Is, the target motor rotational angle θ*, the actual motor rotational angle θ, the proportional-term electric-current component $i_h$, the integral-term electric-current component $i_s$ and the target supply current i* is indicated in FIG. 10 wherein the abscissa axis representing the time axis is lengthened as compared with that of FIG. 9. That is, even where the roll-restraining moment Is shown in FIG. 9 is required, the actual motor rotational angle θ irregularly varies due to the intermittent external input force, whereby the motor-rotational-angle deviation Δθ irregularly varies. In accordance with the irregular variation of the motor-rotational-angle deviation Δθ, the magnitude of the proportional-term electric-current component $i_h$ also varies. As a result, the torque generating direction based on the target supply current i*, namely, the torque generating direction which is the command for controlling the electric motor 70, alternately changes between the neutral direction and the counter-neutral direction plural times. This means that the target supply current i* changes between positive (+) and negative (−) in FIG. 10. Where the target supply current i* is positive, the torque generating direction is the counter-neutral direction while it is the neutral direction where the target supply current i* is negative. Such repeated and alternate changes of the torque generating direction between the counter-neutral direction and the neutral direction may lead to undesirable phenomena such as overload to the actuator 30, generation of abnormal noise and vibration, deterioration in the power consumption characteristic of the actuator 30. The under-supply-power-component-direction-different-situation control is executed to prevent and suppress such phenomena.

More specifically explained, the under-supply-power-component-direction-different-situation control is executed so as to limit the electric current amount to be supplied where the target supply current i* becomes a value that is closer to the integral-term electric-current component than a prescribed threshold β, that is, where the target supply current i* becomes a value on to the counter-neutral direction side (the positive side in FIG. 10) of the threshold β, in the supply-power-component-different situation. The limitation of the electric current or power amount to be supplied is conducted by determining the target supply current i* to a fixed value, i.e., a supply-current-amount limit value $i_1$. In the under-supply-power-component-direction-different-situation control, the characteristics of the stabilizer apparatus 14 are made different depending upon the threshold β and the supply-current-amount limit value $i_1$. FIG. 11(a)-(e) shows respective cases in which the threshold β and the supply-current-amount limit value $i_1$ are made different. The individual cases will be explained hereinafter.

Figure 11:
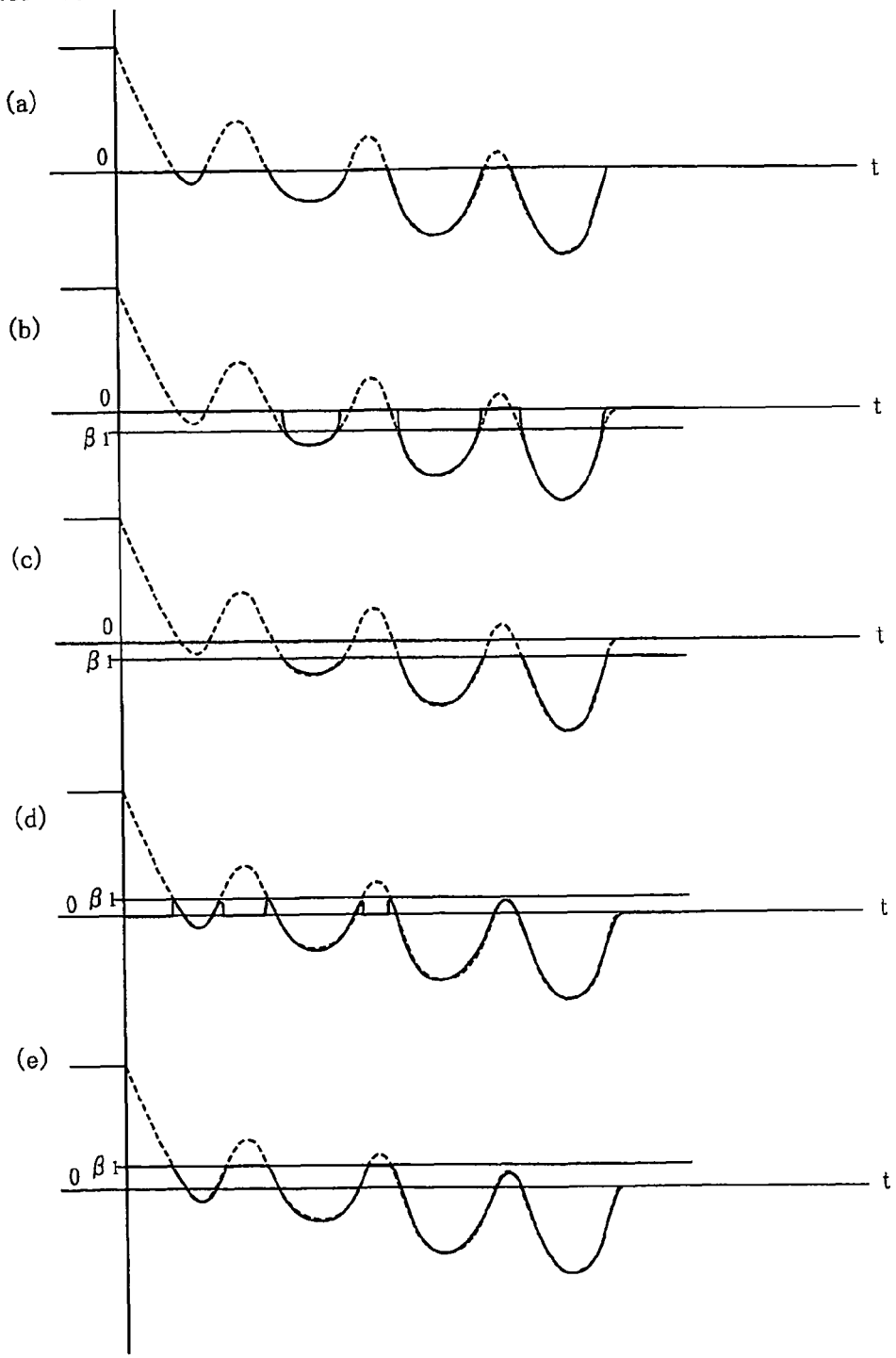
FIG. 11 is a chart schematically showing changes in the target supply current when a prescribed threshold and a supply-current-amount limit value are varied in an under-power-supply-component-direction-different-situation control.

In the case shown in FIG. 11(a), the threshold is set at zero and the supply-current-amount limit value $i_1$ is also set at zero. In the case shown in FIG. 11(a), the electric current supplied to the electric motor 70 is constantly zero or smaller in the supply-power-component-direction-different situation, and the torque generating direction of the electric motor 70 does not coincide with the counter-neutral direction. Therefore, there is generated no alternate changes of the torque generating direction upon the execution of the active control between the neutral direction and the counter-neutral direction. Further, as the time period during which the electric current supplied to the motor 70 is made zero is relatively long, the effect of power saving of the stabilizer system is great. In the case shown in FIG. 11(b), the threshold β is made equal to a value $β_1$ (<0) which is on one of opposite sides of zero that is the side of the torque generating direction based on the proportional-term electric-current component $i_p$, and the supply-current-amount limit value $i_1$ is made zero. In the case shown in FIG. 11(b), the time period during which the torque generating direction coincides with the neutral direction can be made relatively short, thereby inhibiting overshooting of the rotational position of the actuator 30 due to inertia or the like and assuring power saving. In the case shown in FIG. 11(c), the threshold β is made equal to a value $B_1$ (<0) which is on the side of the torque generating direction based on the proportional-term electric-current component $i_p$, and the supply-current-amount limit value $i_1$ is also made equal to β1 which is the same as the threshold β. In the case shown in FIG. 11(c), the above-indicated alternate changes of the torque generating direction between the neutral direction and the counter-neutral direction can be prevented with higher reliability. In the case shown in FIG. 11(d), the threshold β is made equal to a value $β_1$ (>0) which is one of opposite sides of zero that is the side of the torque generating direction based on the integral-term electric-current component $i_s$, and the supply-current-amount limit value $i_1$ is made zero. In the case shown in FIG. 11(d), there slightly exists a state in which the torque generating direction coincides with the counter-neutral direction, so that the aforementioned overshooting can be effectively suppressed and the power saving is assured. In the case shown in FIG. 11(e), the threshold β is made equal to a value $β_1$ (>0) which is on the side of the torque generating direction based on the integral-term electric-current component $i_s$, and the supply-current-amount limit value $i_1$ is also made equal to $β_1$ which is the same as the threshold β. In the case shown in FIG. 11(e), the state in which the torque generating direction coincides with the counter-neutral direction is somewhat larger as compared with the case shown in FIG. 11(d), so that the overshooting can be suppressed more effectively. The threshold β and the supply-current-amount limit value $i_1$ is stored in advance upon shipment of the vehicle in the ECU 110 as respective values that conform to the design concept of the vehicle.

In a state in which the electric current amount to be supplied to the motor 70 is not limited during the under-supply-power-component-direction-different-situation control, the motor 70 is controlled on the basis of the target supply current i* as in the active control. In contrast, in a state in which the electric current amount to be supplied to the motor 70 is limited, the operation of the motor 70 differs depending upon whether the supply-current-amount limit value $i_1$ is zero or not. In detail, where the supply-current-amount limit value $i_1$ is not equal to zero, the torque generating direction and the duty ratio on the basis of the supply-current-amount limit value $i_1$ are fixedly determined, and the operation of the motor 70 based on the determined torque generating direction and the duty ratio is executed. In contrast, where the supply-current-amount limit value $i_1$ is equal to zero, one of the stand-by mode and the braking mode is selected as the operation mode of the motor 70. In the exemplary embodiment, the braking mode is selected where the vehicle speed is not less than a prescribed threshold speed while the stand-by mode is selected where the vehicle speed is smaller than the prescribed threshold speed. Where the braking mode is selected, the vehicle stability during running at a high speed is assured as explained above. Where the stand-by mode is selected, the change pattern of the electrified phase is determined so as to permit the change pattern of the electrified phase and the rotational direction of the motor 70 (in which the motor 70 is actually rotated and which may be different from the torque generating direction) to coincide with each other, in other words, so as to permit the rotational direction of the motor 70 and the torque generating direction as the command value to coincide with each other. The electrified pattern is changed based on the determined pattern, thereby placing the motor 70 in a state in which no electromotive force is generated even by the external input force and in which no braking effect with respect to the external input force is obtained. In consequence, the ride comfort during running at a low speed is improved.

ii) Under-Active-Control-Unnecessary-Situation Control

As mentioned above, the under-active-control-unnecessary-situation control is executed in a state wherein it is regarded that the vehicle is running straightforward. In the present embodiment, the situation in which the roll-moment index amount which is indicative of the roll moment that the vehicle body receives is not greater than a prescribed threshold is identified as the active-control-unnecessary situation. Described in detail referring to FIG. 12, the control-use lateral acceleration Gy* is used as the roll-moment index amount, and a situation in which an absolute value of the control-use lateral acceleration Gy* is not greater than a prescribed threshold lateral acceleration value α as a prescribed threshold amount is identified as the active-control-unnecessary situation. The situation in which the absolute value of the control-use lateral acceleration Gy* is not greater than the prescribed threshold lateral acceleration value α corresponds to a control dead zone in the active control. As explained above, the target supply current i* and the duty ratio are determined, in the active control, depending upon the control-use lateral acceleration Gy* in the active control. Accordingly, a situation in which the target supply current i* or the duty ratio is not greater than a set value may be identified as the active-control-unnecessary situation.

In the present embodiment, the under-active-control-unnecessary-situation control comprises three controls in which control forms are mutually different: a desired-characteristic-dependent control; a neutral-position-dependent control; and an under bad-road-running control. In response to the control mode selected based on the manipulation of the control-mode selective switch 128 by the vehicle operator, one of the desired-characteristic-dependent control and the neutral-position-dependent control is executed. The under-bad-road-running control is executed in preference to the desired-characteristic-dependent control and the neutral-position-dependent control where a prescribed bad-road condition is satisfied. Those three controls will be hereinafter explained referring to a table of FIG. 13 in which is indicated relationships between the rotational direction of the motor 70 by the external input force and the resistance of the actuator 30 against the rotation thereof by the external input force in the respective three controls.

ii-a) Desired-Characteristic-Dependent Control

The desired-characteristic-dependent control is executed so as to establish either one of two vehicle characteristics desired by the vehicle operator: the characteristic that emphasizes vehicle ride comfort (hereinafter may be referred to as "ride-comfort-emphasizing characteristic"); and the characteristic that emphasizes vehicle stability (hereinafter may be referred to as "stability-emphasizing characteristic). These two characteristics are selected by manipulation of the vehicle-characteristic selecting switch 130 by the vehicle operator. Where the ride-comfort-emphasizing characteristic is selected, the operation mode of the motor 70 is placed in the stand-by mode, and the change pattern of the electrified phase and the rotational direction of the motor 70 coincide with each other, throughout the active-control-unnecessary situation. In other words, the motor 70 is controlled such that the torque generating direction to be commanded and the rotational direction by the external input force coincide with each other, whereby no electromotive force is generated in the motor 70 even by the external input force to the actuator 30, that is, no breaking effect is obtained, so that the actuator 30 does not substantially exhibit any resistance against rotation thereof by the external input force, as shown in FIG. 13. As a result, the ride comfort of the vehicle is improved. In the meantime, where the stability-emphasizing characteristic is selected, the operation mode of the motor 70 is placed in the stand-by mode, and the change pattern of the electrified phase and the rotational direction of the motor 70 do not coincide with each other, throughout the active-control-unnecessary situation. In other words, the motor 70 is controlled such that the torque generating direction to be commanded and the rotational direction by the external input force are made opposite to each other, whereby the motor 70 generates electromotive force by the external input force to the actuator 30, that is, the braking effect is obtained, so that the actuator 30 exhibits the resistance against the rotation thereof by the external input force. As a result, the vehicle stability is improved.

ii-b) Neutral-Position-Dependent Control

In the neutral-position-dependent control, the torque generating direction of the electric motor 70 is determined depending upon whether the rotational direction of the motor 70 is the neutral direction or the counter-neutral direction. More specifically explained, the operation mode of the motor 70 is placed in the stand-by mode during the active-control-unnecessary situation. In addition, where the rotational direction of the motor 70 is the neutral direction, the torque generating direction to be commanded is made equal to the same direction, i.e., the neutral direction. Where the rotational direction of the motor 70 is the counter-neutral direction, the torque generating direction is made equal to the opposite direction, i.e., the neutral direction. That is, where the rotational direction of the motor 70 is the neutral direction, the change pattern of the electrified phase in the stand-by mode and the rotational direction of the motor 70 are conformed to each other so as to inhibit generation of the electromotive force for reducing the resistance of the actuator 30 against the rotation thereof to the neutral direction, thereby facilitating return of the actuator 30 to the neutral position. On the contrary, where the rotational direction of the motor 70 is the counter-neutral direction, the change pattern of the electrified phase and the rotational direction of the motor 70 are not conformed to each other so as to permit generation of the electromotive force for increasing the resistance of the actuator 30 against the rotation thereof to the counter-neutral direction, thereby stabilizing the vehicle body when the roll moment acts thereon.

ii-c) Under-Bad-Road Running Control

In the under-bad-road-running control, as long as: the prescribed bad-road condition is satisfied, the operation mode of the electric motor 70 is placed in the free mode even in a case in which the above-indicated desired-characteristic-dependent control or the above-indicated neutral-position-dependent control is selected. Accordingly, even if the external input force to the actuator 30 is in any direction, namely, the rotational direction of the motor 70 by the external input force is in any direction, the actuator 30 is placed in a state in which the actuator does not substantially exhibit the resistance against the rotation thereof by the external input force. Therefore, independency is maintained on the right side and the left side of the vehicle in a situation wherein there acts external force that moves the right-side and left-side wheels vertically in opposite directions, e.g., in a situation wherein the right-side wheel or the left-side wheel runs onto a projection, thereby making it possible to improve the ride comfort during running of the vehicle on the bad road such as a bumpy road, a mogul road, or the like.

5. Stabilizer Control Program

Figure 14:
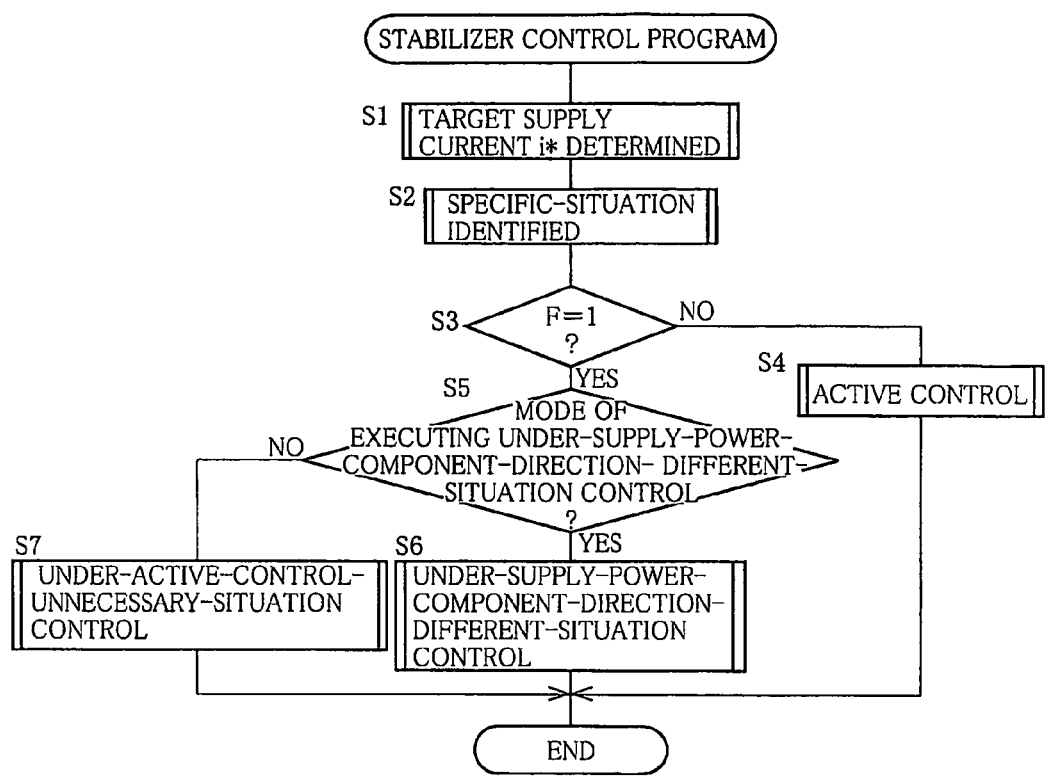
FIG. 14 is a flow chart showing a stabilizer control program.

The control of the present stabilizer system 10 is executed such that a stabilizer control program indicated by a flow chart of FIG. 14 is repeatedly implemented by the ECU 110 at short time intervals (e.g., time intervals ranging from several milliseconds to several tens of milliseconds) with an ignition switch placed in an ON state. Hereinafter, the flow of the stabilizer control will be explained in detail referring to the flow chart of FIG. 14.

Figure 15:
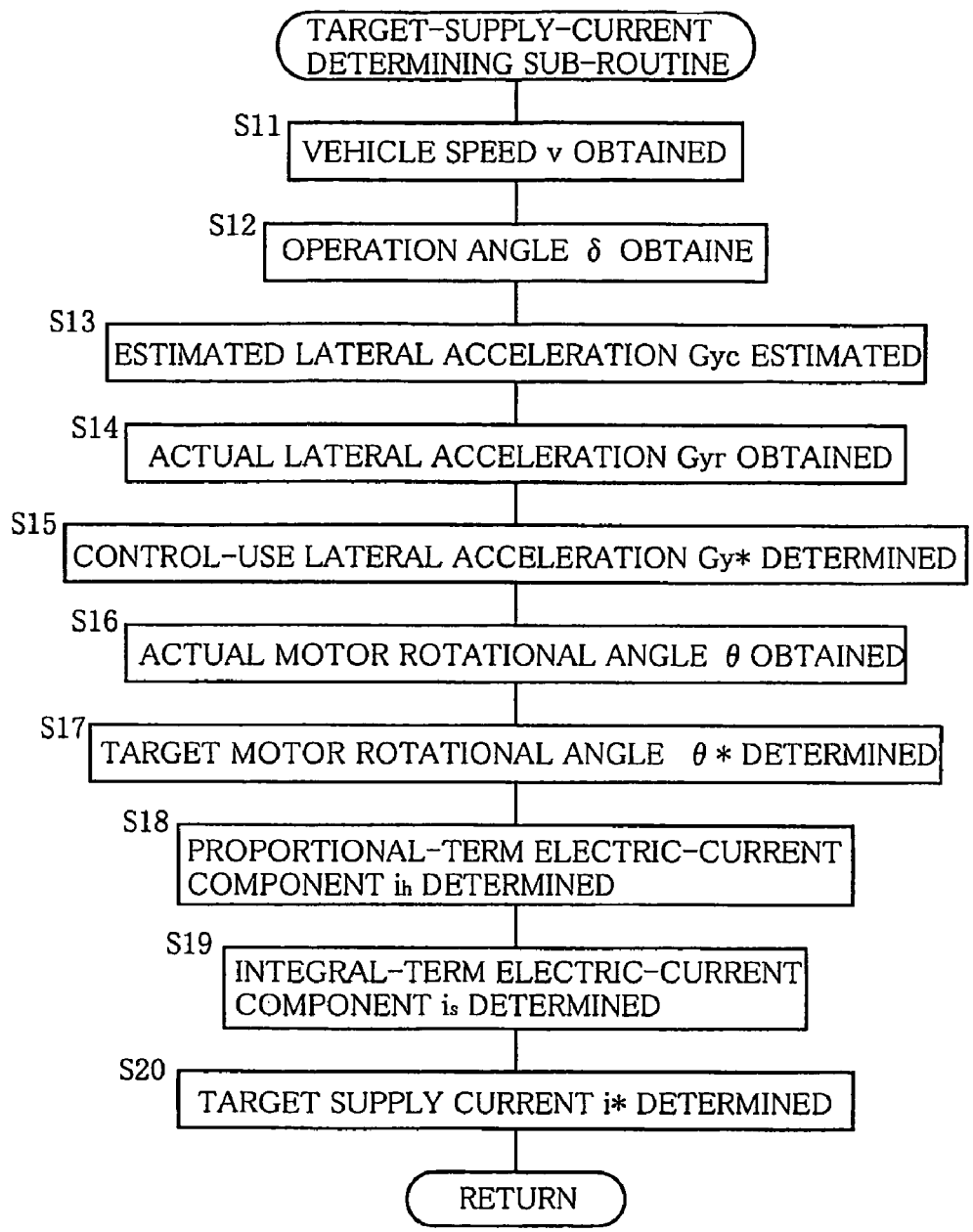
FIG. 15 is a flow chart showing a target-supply-current determining sub-routine implemented in the stabilizer control program.

In the stabilizer control program as a main routine, step S1 ("step" is omitted where appropriate) is initially implemented to execute a target-supply-current-determining sub-routine indicated by a flow chart of FIG. 15. In this sub-routine, initially in S11, a vehicle speed v is obtained based on a value detected by the vehicle-speed sensor 122. In the following S12, an operation angle δ of the steering wheel is obtained based on a value detected by the steering-angle sensor 120. Next, in S13, an estimated lateral acceleration Gyc is estimated based on the vehicle speed v and the operation angle δ. The ECU 110 stores map data which relates to estimated lateral acceleration Gyc and which uses vehicle speed v and operation angle δ as parameters. The estimated lateral acceleration Gyc is obtained by referring to the map data (look-up data). Subsequently, in S14, there is obtained actual lateral acceleration Gyc that is lateral acceleration actually generated in the vehicle body, on the basis of a value detected by the lateral-acceleration sensor 124.

Next, in S15, control-use lateral acceleration Gy* is determined based on the estimated lateral acceleration Gyc and the actual lateral acceleration Gyr. S15 is followed by S16 in which an actual motor rotational angle θ is obtained based on a value detected by the motor-rotational-angle sensor 100. Then, in S17, there is determined a target motor rotational angle θ* of the electric motor 70 based on the determined control-use lateral acceleration Gy*. The ECU 110 stores map data of target motor rotational angle θ* which uses control-use lateral acceleration Gy* as a parameter. The target motor rotational angle θ* is determined referring to the map data. It is noted that the rotational angle of the motor 70 corresponds to the rotational position of the actuator 30. In the present control program, the control of the rotational position of the actuator 30 is actually executed based on the rotational angle of the motor 70. Subsequently, a proportional-term electric-current component $i_h$ is determined in S18 according to the above-mentioned PI control rule, and an integral-term electric-current component $i_s$ is determined in S19. Then, in S20, there is determined a target supply current i* which is a sum of the proportional-term electric-current component $i_h$ and the integral-term electric-current component. Thus, the sub-routine is terminated.

Figure 16:
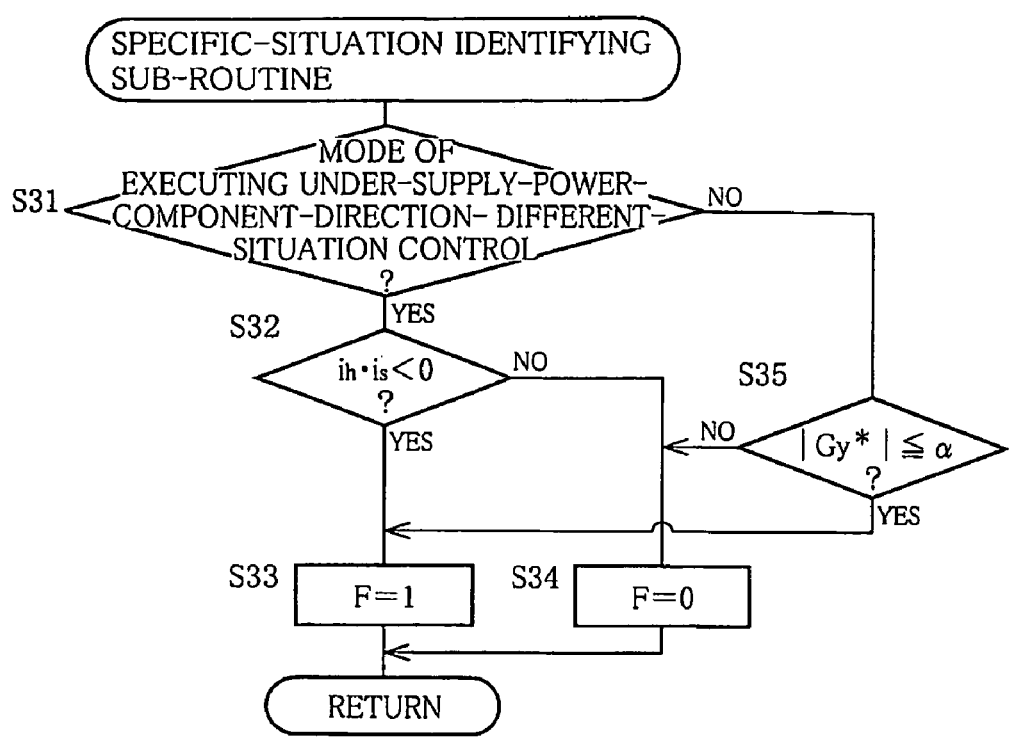
FIG. 16 is a flow chart showing a specific-situation identifying sub-routine implemented in the stabilizer control program.

After the implementation of the target-supply-current determining sub-routine has been completed, there is implemented in S2 a specific-situation identifying sub-routine indicated by a flow chart of FIG. 16. In the sub-routine of FIG. 16, it is judged in S31 whether a mode of executing the under-supply-power-component-direction-different-situation control is selected by the control-mode selecting switch 128. If an affirmative decision (YES) is made in S31, S32 is implemented to judge whether a product of the proportional-term electric-current component $i_h$ and the integral-term electric-current component $i_s$ is negative or not. Where the product is negative, a specific-situation flag F is set at 1 in S33 while the flag F is set at 0 in S34 where the product is not negative. The specific-situation flag F is a flag for indicating whether or not a current situation is the specific situation. When F is equal to 1 (F=1), the current situation is the specific situation. When F is equal to 0 (F=0), the current situation is not the specific situation. Where a negative decision (N0) is made in S31, that is, where the mode of executing the under-supply-power-direction-different-situation control is not selected by the mode-selecting switch 128, namely, where a mode of executing the under-active-control-unnecessary-situation control is selected, S35 is implemented to judge whether or not an absolute value of the control-use lateral acceleration Gy* is not greater than the prescribed threshold lateral acceleration value α. If an affirmative decision (YES) is made in S35, S33 is implemented to set the specific-situation flag F at 1. If a negative decision (NO) is made in S35, S34 is implemented to set the specific-situation flag F at 0. The sub-routine of FIG. 16 is terminated with the specific-situation flag F set at 0 or 1.

After the specific-situation identifying sub-routine has been implemented, it is judged in S3 of the main routine of FIG. 14 whether the flag F is set at 1 or not. Where the specific-situation flag F is not set at 1, the control flow goes to S4 to execute the active control explained above. The active control is executed by implementing an active-control sub-routine (not illustrated). More specifically explained, there is issued, to inverters 104, a command to place the operation mode of the electric motor 70 in the above-indicated power-supplying control mode, and the torque generating direction and the duty ratio_based on the target supply current i* are sent to the inverters 104 as command values, whereby the change pattern of the electrified phase is determined based on the torque generating direction, and an electric current based on the duty ratio is supplied to the motor 70.

Where it is judged in S3 that the specific-situation flag F is set at 1, S5 is implemented to judge whether or not the mode of executing the under-supply-power-component-direction-different-situation control is selected by the control-mode selecting switch 128. If an affirmative decision (YES) is made in S5, the control flow goes to S6 to implement an under-power-supply-component-direction-different-situation-control sub-routine indicated by a flow chart of FIG. 17. On the other hand, if a negative decision (NO) is made in S5, the control flow goes to S7 to implement an under-active-control-unnecessary-situation-control sub-routine indicated by a flow chart of FIG. 18.

Figure 17:
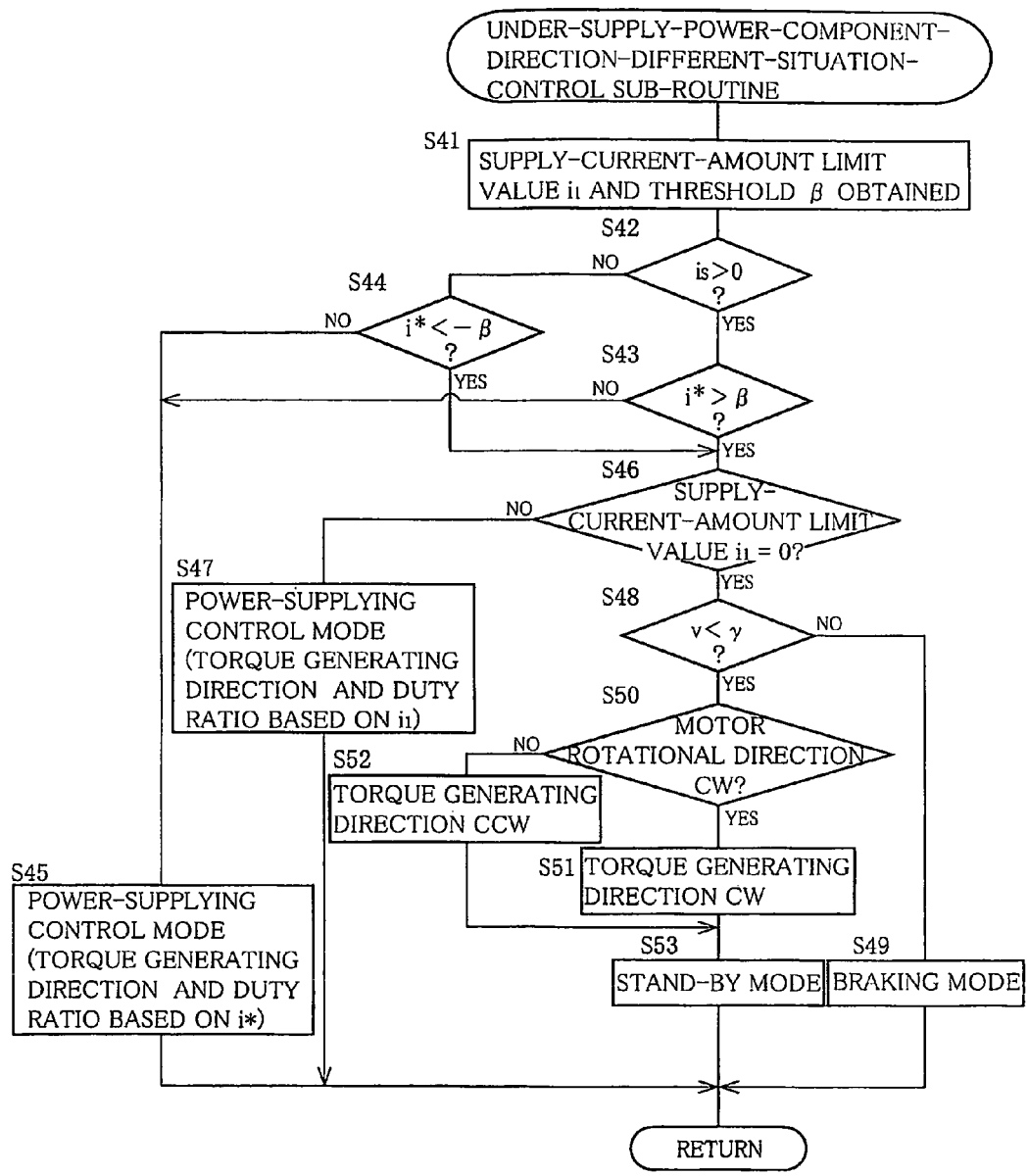
FIG. 17 is a flow chart showing an under-supply-power-component-direction-different-situation-control sub-routine implemented in the stabilizer control program.

In the sub-routine of the flow chart of FIG. 17, initially in S41, a supply-current-amount limit value $i_l$ and a prescribed threshold β are read out and obtained. Then, it is judged in S42 whether the integral-term electric-current component $i_s$ is larger than 0 or not. Where the integral-term electric-current component $i_s$ is larger than 0, S43 is implemented to judge whether the target supply current i* is larger than the prescribed threshold β which is stored in the ECU 110. Where it is judged in S42 that the integral-term electric-current component $i_s$ is not larger than 0, S44 is implemented to judge whether or not the target supply current i* is smaller than a prescribed threshold −β. When it is judged in S43 that the target supply current i* is not larger than the threshold β or when it is judged in S44 that the target supply current i* is not smaller than the threshold −β, the control flow goes to S45 in which there is issued, to the inverters 104, a command to place the operation mode of the motor 70 in the aforementioned power-supplying control mode, and the torque generating direction and the duty ratio based on the target supply current i* are sent to the inverters 104 as command values, thereby executing processing similar to that in the active control mentioned above.

On the other hand, when it is judged in S43 that the target supply current i* is larger than the threshold β or when it is judged in S44 that the target supply current i* is smaller than the threshold −β, S46 is implemented to judge whether the supply-current-amount limit value $i_l$ is 0 or not. Where the supply-current-amount limit value $i_l$ is not 0, the control flow goes to S47 in which there is issued, to the inverters 104, a command to place the operation mode of the motor 70 in the power-supplying control mode, and the torque generating direction and the duty ratio based on the supply-current-amount limit value $i_l$ are sent to the inverters 104 as command values, thereby executing processing similar to that in the active control mentioned above.

Figure 18:
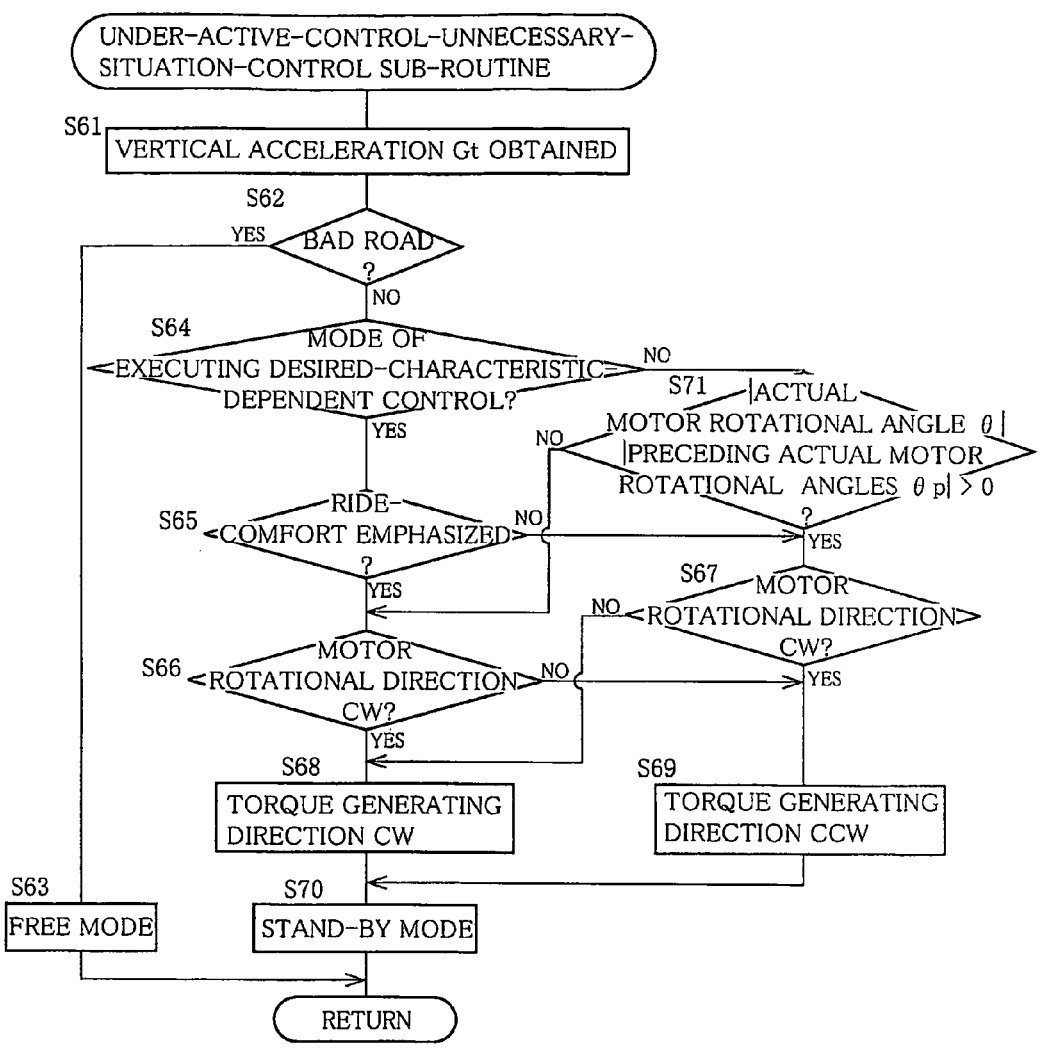
FIG. 18 is a flow chart showing an under-active-control-unnecessary-situation-control sub-routine implemented in the stabilizer control program.

When it is judged in S46 that the supply-current-amount limit value $i_l$ is zero, S48 is carried out to judge whether the vehicle speed is smaller than the prescribed threshold speed γ. Where the vehicle speed v is not less than the threshold speed γ, the control flow goes to S49 in which the operation mode of the motor 70 is determined to be the braking mode and there is issued, to the inverters 104, a command to place the operation mode in the braking mode. On the other hand, where the vehicle speed v is smaller than the threshold speed γ, the control flow goes to S50 to judge the rotational direction of the motor 70 by the external input force. Subsequently, either in S51 or S52, the torque generating direction of the motor 70 as the command value is determined to be the same as the judged rotational direction. Then, in S53, there is issued, to the inverters 104, a command to place the operation mode of the motor 70 in the stand-by mode and there is sent, to the inverters 104, the supply power amount of zero, i.e., the duty ratio of zero, as the command value. According to the processing, the changing of the electrified phase of the motor 70 is performed in a state in which no power is supplied to the motor 70. The sub-routine of FIG. 17 is completed with the implementation of either one of S45, S47, S49 and S53.

Where the under-active-control-unnecessary-situation-control sub-routine indicated by the flow chart of FIG. 18 is carried out, initially, in S61, vertical acceleration Gt is obtained based on values detected by the respective vertical acceleration sensors 126 provided in the respective wheels. Subsequently, it is judged in S62 whether or not the vehicle is traveling on a bad road (bad-road judgment) based on the obtained vertical acceleration Gt. In the bad-road judgment, on the basis of the vertical acceleration Gt obtained in the current execution of the program and vertical acceleration Gt obtained in preceding execution of the program, a status in which a manner of change in the current and preceding vertical acceleration Gt corresponds to a preset manner is defined as the bad-road condition. When the bad-road condition is satisfied, it is identified that the vehicle is traveling on the bad rod. As an algorithm of the bad-road judgment, there may be employed one known in the art, and a detailed explanation of which is dispensed with. When it is judged that the vehicle is running on the bad road, S63 is implemented to place the operation mode of the motor 70 in the free mode indicated above, and there is issued, to the inverters 104, a command to place the operation mode of the motor 70 in the free mode.

Where it is judged in S62 that the vehicle is not running on the bad road, S64 is implemented to judge whether a mode of executing the desired-characteristic-dependent control is selected by the control-mode selecting switch 128. If an affirmative decision (YES) is made in S64, S65 and the subsequent steps are implemented to execute the desired-characteristic-dependent control. In this control, initially in S65, it is judged whether the ride-comfort-emphasizing characteristic is selected by the vehicle-characteristic selecting switch 130. Where the ride-comfort-emphasizing characteristic is selected, S66 is implemented to identify the rotational direction of the motor 70 by the external input force. Subsequently, in S68 and S69, the torque generating direction as the command value is determined to be the same as the identified rotational direction. On the contrary, where the ride-comfort-emphasizing characteristic is not selected in S65, that is, where the stability-emphasizing characteristic is selected, S67 is implemented to identify the rotational direction of the motor 70 by the external input force. Subsequently, in S68 and S69, the torque generating direction as the command value is determined to be a direction opposite to the identified rotational direction. Then, in S70, there are sent, to the inverters 104, a command to place the operation mode of the motor 70 in the above-indicated stand-by mode and the determined torque generating direction. According to the proceeding, the electrified phase of the motor 70 is suitably changed while no power is supplied to the motor 70.

Where the mode of executing the desired-characteristic-dependent control is not selected in S64, that is, where a mode of executing the neutral-position-dependent control is selected, S71 and subsequent steps are implemented to execute the neutral-position-dependent control. In this control, S71 is initially carried out to judge whether a difference between an absolute value of the actual motor rotational angle θ and a preceding actual motor rotational angle θp which is obtained in an execution of the program preceding the current execution is positive or not. Where the difference is positive, that is, when the motor 70 is rotated such that the rotational position of the actuator 30 is directed toward the counter-neutral direction, S67 is implemented to identify the rotational direction of the motor 70 by the external input force. Subsequently, in S68 and S69, the torque generating direction as the command value is determined to be a direction opposite to the identified rotational direction. Where it is judged in S71 that the above-indicated difference between the absolute value of the actual motor rotational angle θ and the preceding actual motor rotational angle θp is not positive, that is, when the motor is rotated such that rotational position of the actuator 30 is directed toward the neutral direction, S66 is implemented to identify the rotational direction of the motor 70 by the external input force. Subsequently, in S68 and S69, the torque generating direction as the command value is determined to be the same direction as the rotational direction of the motor 70. As in a case in which the mode of executing the desired-characteristic-dependent control is selected, S70 is implemented to send a command to place the operation mode of the motor 70 in the stand-by mode explained above and the determined torque generating direction, to the inverters 104. Accordingly, the electrified phase of the motor 70 is suitably changed while no power is supplied to the motor 70. The sub-routine indicated by the flow chart of FIG. 18 is completed with implementation of S63 or S70.

6. Functional Structure of Control Apparatus

Figure 19:
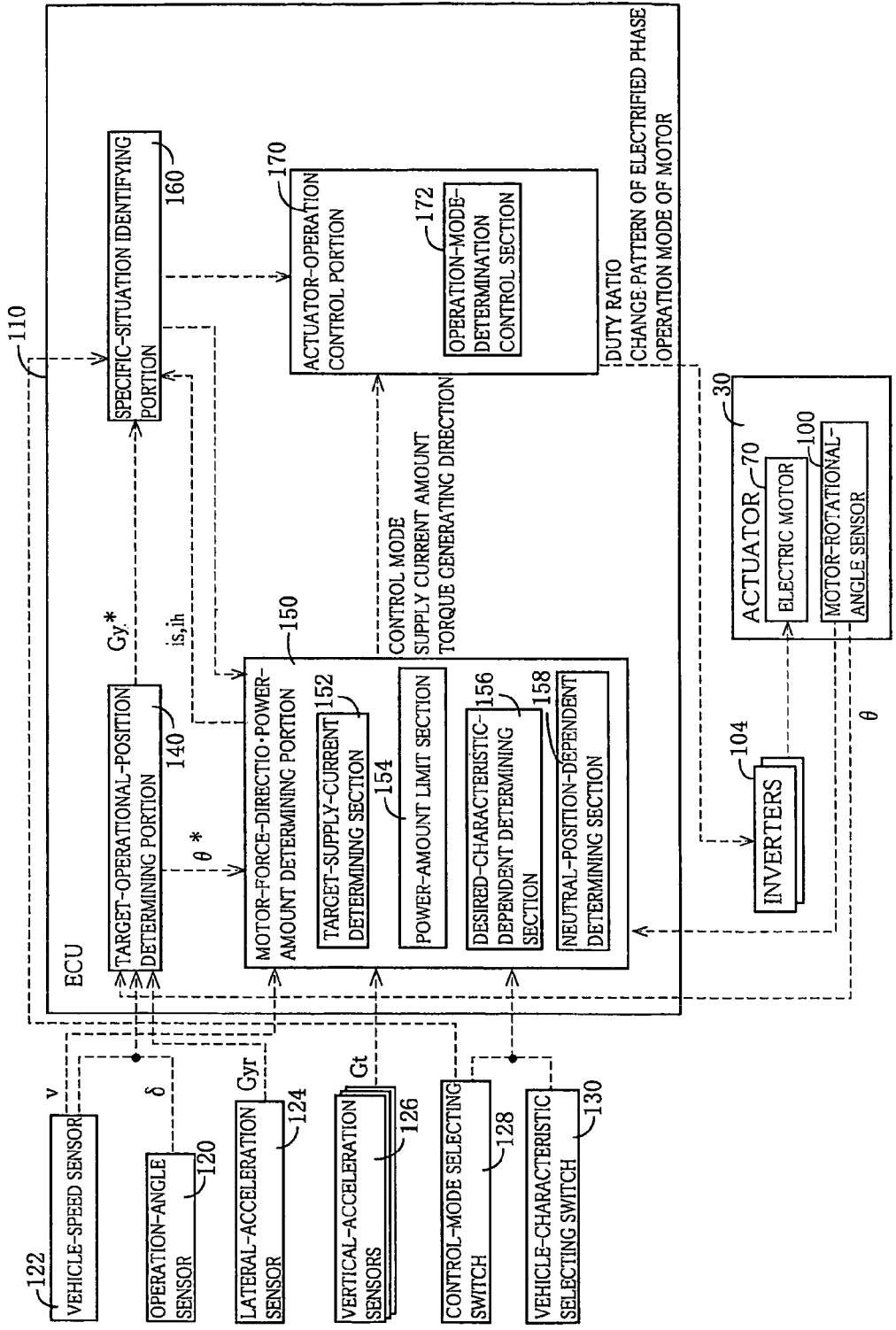
FIG. 19 is a block diagram showing functions of a stabilizer electronic control unit as a control apparatus.

The ECU 110 as the control apparatus for controlling the present stabilizer system functioning by execution of the stabilizer control program explained above may be considered to have functional structure shown in FIG. 19 from the standpoint of the proceeding to be executed. According to the functional structure, the ECU 110 includes a target-operational-position determining portion 140 as a functional portion which executes the proceeding in S11-S17 and a motor-force-direction•power-amount determining portion 150 as a functional portion which executes the proceeding in S18-S20, S42-S44, S46, S48, S50-S52, S65-S69, S71 and so on, namely, a functional portion which determines the torque generating direction of the motor 70 and the target supply current i* indicative of the electric current amount to be supplied to the motor 70. The ECU 110 further includes a specific-situation identifying portion 160 as a functional portion which executes the proceeding of S2, i.e., S31-S35 and so on, and an actuator-operation control portion 170 as a functional portion which executes the proceeding in S4, S7, S45, S47, S49, S53, S63, S70 and so on, namely a functional portion which determines the operation mode of the motor 70 and which also determines the change pattern of the electrified phase and the duty ratio on the basis of the torque generating direction and the electric current amount supplied to the motor 70 transmitted from the motor-force-direction•power-amount determining portion 150. More specifically explained, the motor-force-direction•power-amount determining portion 150 includes: a target-supply-current determining section 152 as a functional section which executes the proceeding in S18-S20 and so on; a power-amount limit section 154 as a functional section which executes the proceeding in S42-S44; S46, S48, S50-S52 and so on in the supply-power-component-direction-different-situation control; a desired-characteristic-dependent determining section 156 as a functional section which executes the proceeding in S65-S69 and so on in the desired-characteristic-dependent control; and a neutral-position-dependent determining section 158 as a functional section which executes the proceeding in S66-S69, S71 and so on in the neutral-position-dependent control. Further, the actuator-operation control portion 170 has a function of selectively determining the operation mode of the motor 70 among the four modes mentioned above, whereby the actuator-operation control portion 170 is equipped with an operation-mode-determination control section 172.

The supply-power-component-direction-different-situation control, and the neutral-position-dependent control and the desired-characteristic-dependent control which are the active-control-unnecessary-situation control aim at making the readiness of the operation of the actuator different depending upon the operational direction as explained above. In this respect, it may be considered that the present stabilizer system 10 is equipped with a means for differentiating operation readiness.

The invention claimed is:

1. A stabilizer system for a vehicle comprising: a stabilizer bar connected to left and right wheels at respective opposite ends thereof; an actuator which has an electric motor and which changes, owing to motor force generated by the electric motor, stiffness of the stabilizer bar with respect to roll of a body of the vehicle according to an operational position of the actuator; a control device including: a motor-force-direction•power-amount determining portion which determines a motor-force generating direction that is a direction of generation of the motor force to be generated by the electric motor and a supply power amount to the electric motor corresponding to a magnitude of the motor force; and an actuator-operation control portion which controls an operation of the actuator on the basis of the motor-force generating direction and the supply power amount; and a target-operational-position determining portion which determines a target operational position of the actuator, wherein the motor-force-direction•power-amount determining portion determines the motor-force generating direction and the supply power amount on the basis of a supply-power-component sum that is a sum of (a): a displacement-amount-dependent supply-power component determined depending upon a displacement amount of the operational position of the actuator with respect to a neutral position; and (b) a deviation-dependent supply-power component based on operational-position deviation which is deviation of the operational position with respect to the target operational position, wherein the actuator-operation control portion controls the operation of the actuator on the basis of the target operational position, and wherein that the motor-force-direction•power-amount determining portion includes a power-amount limit section which limits the supply power amount when the supply-power-component sum becomes a value that is closer to the displacement-amount-dependent supply-power component than a prescribed threshold in a specific situation, in which a direction of generation of the motor force based on the displacement-amount-dependent supply-power component and a direction of generation of the motor force based on the deviation-dependent supply-power component differ from each other.

2. The stabilizer system according to claim 1, wherein the displacement-amount-dependent supply-power component corresponds to operational-position-maintaining power which is power that permits the electric motor to exhibit the motor force necessary for maintaining the operational position of the actuator, and the deviation-dependent supply-power component corresponds to corrective power which corrects the operational-position-maintaining power for changing the operational position of the actuator.

3. The stabilizer system according to claim 1, wherein the displacement-amount-dependent supply-power component corresponds to power that permits the electric motor to exhibit the motor force determined based on negative efficiency of the actuator.

4. The stabilizer system according to claim 1,
wherein the motor-force-direction•power-amount determining portion determines the motor-force generating direction and the supply power amount according to one of a PI-control rule and a PDI-control rule which are based on the operational-position deviation, and wherein the displacement-amount-dependent supply-power component is specified by an integral term while the deviation-dependent supply-power component is specified by a proportional term where the motor-force generating direction and the supply power amount are determined according to the PI-control rule or by a sum of the proportional term and a differential term where the motor-force generating direction and the supply power amount are determined according to the PDI-control rule.

5. The stabilizer system according to claim 1, wherein the prescribed threshold is set at 0.

6. The stabilizer system according to claim 1, wherein the power-amount limit section determines the supply power amount to be a prescribed fixed value.

7. The stabilizer system according to claim 1, wherein the power-amount limit section determines the supply power amount to be 0.

8. The stabilizer system according to claim 1,
wherein the electric motor is operable in at least one operation mode selected from: a phase-change-executing no-power-supply mode in which changing of an electrified phase is executed so as to permit the motor-force generating direction to coincide with the direction of generation of the motor force based on the deviation-dependent supply-power component while no power is supplied to the electric motor; and a phase-interconnection mode in which respective phases of the electric motor is connected to each other, wherein the actuator-operation control portion includes an operation-mode-determination control section which determines the operation mode of the electric motor to be the at least one operation mode and thereby controls an operation of the electric motor, when the supply power amount is limited by the power-amount limit section, and wherein the electric motor is operable in both of the phase-change-executing no-power-supply mode and the phase-interconnection mode, and the operation-mode-determination control section selectively determines the operation mode of the electric motor to be one of the phase-change-executing no-power-supply mode and the phase-interconnection mode and thereby controls the operation mode of the electric motor.

9. A stabilizer system for a vehicle comprising: a stabilizer bar connected to left and right wheels at respective opposite ends thereof; an actuator which has an electric motor and which changes, owing to motor force generated by the electric motor, stiffness of the stabilizer bar with respect to roll of a body of the vehicle according to an operational position of the actuator; a control device including: a motor-force-direction•power-amount determining portion which determines a motor-force generating direction that is a direction of generation of the motor force to be generated by the electric motor and a supply power amount to the electric motor corresponding to a magnitude of the motor force; and an actuator-operation control portion which controls an operation of the actuator on the basis of the motor-force generating direction and the supply power amount, wherein the motor-force-direction•power-amount determining portion determines the motor-force generating direction on the basis of an operational direction of the actuator in a situation, as the specific situation, in which the supply power amount is expected to be 0, and wherein the means for differentiating operation readiness is constituted such that the actuator-operation control portion includes an operation-mode-determination control section which determines, in the specific situation, an operation mode of the electric motor to be a phase-change-executing no-power-supply mode in which changing of an electrified phase of the electric motor is executed corresponding to the motor-force generating direction while no power is supplied to the electric motor, and thereby controls an operation of the electric motor.

10. The stabilizer system according to claim 9, wherein the motor-force-direction•power-amount determining portion is arranged to changeably determine, in the specific situation, the motor-force generating direction to be the same as or opposite to the direction that corresponds to the operational direction of the actuator.

11. The stabilizer system according to claim 10,
wherein the motor-force-direction•power-amount determining portion determines, in the specific situation, the motor-force generating direction to vary dependent upon which one of ride comfort of the vehicle and stability of the body of the vehicle is emphasized, and
wherein the motor-force-direction•power-amount determining portion includes a desired-characteristic-dependent determining section which determines the motor-force generating direction to be the same as the direction that corresponds to the operational direction of the actuator where the ride comfort of the vehicle is emphasized and which determines the motor-force generating direction to be opposite to the direction that corresponds to the operational direction of the actuator where the stability of the body of the vehicle is emphasized.

12. The stabilizer system according to claim 10, wherein the motor-force-direction•power-amount determining portion includes a neutral-position-dependent determining section which determines, in the specific situation, the motor-force generating direction: to be the same as the direction that corresponds to the operational direction of the actuator where the operational direction of the actuator coincides with a direction that permits the operational position of the actuator to come closer to a neutral position; and to be opposite to the direction that corresponds to the operational direction of the actuator where the operational direction of the actuator coincides with a direction that permits the operational position of the actuator to separate away from the neutral position.

13. The stabilizer system according to claim 9, wherein the control device further includes a specific-situation identifying portion which identifies the specific situation.

14. The stabilizer system according to claim 13, wherein the specific-situation identifying portion identifies the specific situation when a roll-moment index amount indicative of roll moment acting on the body of the vehicle is not greater than a prescribed threshold.

15. The stabilizer system according to claim 13, wherein the motor-force-direction•power-amount determining portion determines the motor-force generating direction and the supply power amount on the basis of a roll-moment index amount indicative of roll moment acting on the body of the vehicle.

* * * * *